US012790887B2

(12) United States Patent
Bruchu et al.

(10) Patent No.: US 12,790,887 B2
(45) Date of Patent: Nov. 10, 2026

(54) PACKAGED PREHUNG DOOR SYSTEM

(71) Applicant: ANDERSEN CORPORATION, Bayport, MN (US)

(72) Inventors: Todd Bruchu, Lake Elmo, MN (US); Craig Johnson, North Oaks, MN (US); Justin Depew, Stillwater, MN (US); Michael Mordick, Bayport, MN (US); Paul Morris, Roseville, MN (US); Ben Boenisch, Bayport, MN (US); Matthew Nelson, Woodbury, MN (US)

(73) Assignee: ANDERSEN CORPORATION, Bayport, MN (US)

( * ) Notice: Subject to any disclaimer, the term of this patent is extended or adjusted under 35 U.S.C. 154(b) by 186 days.

(21) Appl. No.: 18/426,964

(22) Filed: Jan. 30, 2024

(65) Prior Publication Data

US 2024/0254831 A1 Aug. 1, 2024

Related U.S. Application Data

(60) Provisional application No. 63/441,938, filed on Jan. 30, 2023.

(51) Int. Cl.

| | |
|---|---|
| ***E06B 7/28*** | (2006.01) |
| ***E06B 1/04*** | (2006.01) |
| ***E06B 1/52*** | (2006.01) |
| ***E06B 3/36*** | (2006.01) |

(52) U.S. Cl.

CPC .................. *E06B 7/28* (2013.01); *E06B 1/04* (2013.01); *E06B 1/526* (2013.01); *E06B 3/36* (2013.01)

(58) Field of Classification Search

CPC ... E06B 7/28; E06B 3/36; E06B 1/526; E06B 1/04

USPC ........................................... 49/380; 52/204.1

See application file for complete search history.

(56) References Cited

U.S. PATENT DOCUMENTS

| | | | |
|---|---|---|---|
| 2,720,308 | A | 10/1955 | Howell |
| 2,835,525 | A | 5/1958 | Arvo |
| 2,911,095 | A | 11/1959 | Hutch |
| 2,917,790 | A | 12/1959 | Espenschied |
| 3,103,714 | A | 9/1963 | Wilks |
| 3,205,982 | A | 9/1965 | Anthony |
| 3,216,066 | A | 11/1965 | Hadacek |
| 3,301,820 | A | 1/1967 | Haendiges |
| 3,393,471 | A | 7/1968 | Skowlund et al. |

(Continued)

FOREIGN PATENT DOCUMENTS

GB 2272478 A 5/1994

OTHER PUBLICATIONS

Krieger Specialty Products. "Typical Problems with Door and Frame Installation" Fact Sheet. Retrieved from the Internet at <http://kriegerspecialtyproducts.com/downloads/pibs/PIB_No_102.pdf>. 1 page. No Date.

(Continued)

*Primary Examiner* — Brent W Herring

(74) *Attorney, Agent, or Firm* — Mueting Raasch Group

(57) ABSTRACT

Packaged prehung door systems, components thereof, and related methods are described herein. The packaged prehung door systems described herein may include latch edge retainer apparatus and bottom edge spacer assemblies. Methods of maintaining squareness of the packaged prehung door systems described herein during transportation and installation are also described.

31 Claims, 18 Drawing Sheets

(56) References Cited

U.S. PATENT DOCUMENTS

| | | | | |
|---|---|---|---|---|
| 3,430,385 | A | 3/1969 | Biro | |
| 3,593,458 | A * | 7/1971 | Wahlfeld | E06B 7/00 206/325 |
| 3,618,261 | A | 11/1971 | Torbett | |
| 3,631,644 | A | 1/1972 | Mazza | |
| 3,871,283 | A | 3/1975 | John | |
| 3,969,866 | A | 7/1976 | Kyne | |
| 4,001,972 | A | 1/1977 | Hurwitz | |
| 4,043,001 | A | 8/1977 | Parsons | |
| 4,073,038 | A | 2/1978 | Curry et al. | |
| 4,106,238 | A | 8/1978 | Bonello | |
| 4,713,922 | A | 12/1987 | Ingold | |
| 4,736,565 | A | 4/1988 | Bisson | |
| 5,024,475 | A * | 6/1991 | Francis | E05B 15/0205 292/346 |
| 5,056,263 | A | 10/1991 | Bies | |
| 5,056,835 | A | 10/1991 | Johnson | |
| 5,119,870 | A | 6/1992 | Rabberman | |
| 5,152,487 | A | 10/1992 | Defatte et al. | |
| 5,159,782 | A | 11/1992 | Sales | |
| 5,209,017 | A | 5/1993 | Ridge | |
| 5,216,839 | A | 6/1993 | Woodruff | |
| 5,337,526 | A | 8/1994 | Hartman | |
| 5,365,697 | A | 11/1994 | Vanderpan | |
| 5,562,315 | A | 10/1996 | Sales | |
| 5,722,203 | A * | 3/1998 | Staples | E06B 7/00 49/380 |
| 5,787,639 | A | 8/1998 | Lamore, Jr. | |
| 5,829,098 | A | 11/1998 | Alonso | |
| 6,023,224 | A * | 2/2000 | Meyvis | E05F 15/77 49/31 |
| 6,138,413 | A | 10/2000 | Fehr | |
| 6,170,198 | B1 | 1/2001 | Staples et al. | |
| 6,357,200 | B1 | 3/2002 | Vanderpan | |
| 6,397,431 | B1 | 6/2002 | Alonso | |
| 6,405,506 | B2 | 6/2002 | Ruff | |
| 6,560,934 | B1 | 5/2003 | Workman | |
| 6,622,432 | B2 | 9/2003 | Zacher et al. | |
| 6,634,059 | B2 | 10/2003 | Seiferd | |
| 6,640,387 | B2 | 11/2003 | Alonso | |
| 6,676,178 | B2 | 1/2004 | Budhrani | |
| 6,883,203 | B2 | 4/2005 | Libes | |
| 7,007,439 | B1 | 3/2006 | Larson et al. | |
| 7,117,639 | B2 | 10/2006 | Abdella et al. | |
| 7,118,143 | B2 | 10/2006 | L'Heureux et al. | |
| 7,121,045 | B2 | 10/2006 | Massey et al. | |
| 7,213,299 | B2 | 5/2007 | Grande | |
| 7,347,462 | B2 | 3/2008 | Ellis | |
| 7,497,344 | B2 | 3/2009 | Chen | |
| D595,866 | S | 7/2009 | Kibbel | |
| 7,581,352 | B2 | 9/2009 | Klingbyle | |
| 7,588,272 | B2 | 9/2009 | Gephart | |
| D605,496 | S | 12/2009 | Scheuermann et al. | |
| 7,661,226 | B2 | 2/2010 | Kibbel et al. | |
| 7,698,796 | B1 | 4/2010 | Brock et al. | |
| 7,716,880 | B1 | 5/2010 | Shray et al. | |
| 7,877,940 | B2 | 2/2011 | Meeks et al. | |
| 7,987,637 | B2 | 8/2011 | Smith | |
| 8,146,295 | B2 | 4/2012 | Kibbel et al. | |
| 8,245,448 | B2 | 8/2012 | Crane et al. | |
| 8,857,105 | B2 | 10/2014 | Hemping et al. | |
| 9,382,751 | B2 | 7/2016 | Hemping et al. | |
| 9,482,016 | B2 | 11/2016 | Kelley | |
| 10,240,353 | B2 | 3/2019 | Procton et al. | |
| 10,526,835 | B2 | 1/2020 | Hemping et al. | |
| 11,686,135 | B1 | 6/2023 | Smith | |
| 2003/0005641 | A1 | 1/2003 | Eakes et al. | |
| 2004/0060241 | A1 * | 4/2004 | Staples | E06B 7/28 206/325 |
| 2005/0011132 | A1 * | 1/2005 | Griffin, Jr. | E05B 9/002 49/460 |
| 2005/0086879 | A1 * | 4/2005 | Sales | E05C 19/182 52/204.1 |
| 2005/0284091 | A1 | 12/2005 | Sales | |
| 2006/0150524 | A1 | 7/2006 | Kibbel et al. | |
| 2006/0248821 | A1 | 11/2006 | Fitzpatrick | |
| 2006/0260216 | A1 | 11/2006 | Bonshor | |
| 2007/0221597 | A1 | 9/2007 | Chen | |
| 2009/0146439 | A1 | 6/2009 | Watts et al. | |
| 2012/0047809 | A1 | 3/2012 | Hemping et al. | |
| 2013/0047514 | A1 | 2/2013 | Kaestle et al. | |
| 2014/0223831 | A1 * | 8/2014 | Jones | E06B 1/52 49/504 |
| 2016/0145028 | A1 * | 5/2016 | Kelley | B65D 81/055 24/304 |
| 2017/0058562 | A1 * | 3/2017 | Bunch | E05B 17/2084 |
| 2017/0204621 | A1 * | 7/2017 | Procton | E06B 3/70 |
| 2018/0202194 | A1 * | 7/2018 | Jaskiewicz | E05B 59/00 |
| 2021/0207421 | A1 * | 7/2021 | Sorice | E05F 15/73 |
| 2021/0270046 | A1 | 9/2021 | Wermers et al. | |

OTHER PUBLICATIONS

Mizrachi. "How to repair my front door". Mar. 22, 2012. Retrieved from the Internet at <http://ths.gardenweb.com/discussions/2596368/how-to-repair-my-front-door>. 2 pages.

Home Improvement—General/New Pella French Door Installation. Advertisement. Retrieved from the internet on Dec. 11, 2015 at <http://en.allexperts.com/q/Home-Improvement-General-688/2008/6/New-Pella-French-Door.htm>. 2 pages.

* cited by examiner

PACKAGED PREHUNG DOOR SYSTEM

RELATED APPLICATION

The present application claims the benefit under 35 USC Section 119 of U.S. Provisional Application Ser. No. 63/441,938 filed 30 Jan. 2023, titled PACKAGED PREHUNG DOOR SYSTEM AND METHOD which is incorporated herein by reference in its entirety.

Packaged prehung door systems, components thereof, and related methods are described herein.

Prehung door systems are sold as a convenient product to simplify and expedite the process of installing doors in buildings. The prehung door systems include, by definition, door panels attached to the hinge side jambs of a frame. As such, the prehung door systems can be susceptible to damage during shipping and still require care to be taken during installation to ensure that the frame is square and the door panel is properly positioned within the frame after installation.

SUMMARY

Packaged prehung door systems, components thereof, and related methods are described herein.

In one or more embodiments, the packaged prehung door systems described herein include a latch edge retainer apparatus as well as bottom edge spacer assemblies that, along with the hinges, provide a robust packaging system that protects the door panel and frame integrity during transport and, in one or more embodiments, holds the frame square relative to the door panel to simplify installation of the prehung door system in a building opening.

In one or more embodiments, the bottom edge spacer assemblies of the packaged prehung door systems described herein are sized to support the door panel on the sill above which they are located. In one or more embodiments, the bottom edge spacer assemblies have a height sufficient to support at least a portion of and, in some embodiments, all or nearly all, the weight of the door panel such that, during transport and installation, the hinges are not required to support the door panel above the sill.

In one or more embodiments, the latch edge retainer apparatus is configured to retain the latch edge of a door panel in alignment with the latch side jamb using components extending through the lockset bore formed through the panel as well as the latch bore formed through the latch edge of the door panel. The latch edge retainer apparatus includes a panel clip attached to the door panel, in one or more embodiments, the panel clip is present only on one face and the latch edge of the door panel and a lock plug that interlocks with a lock aperture in the panel clip. The lock plug extends into a latch cavity formed in the latch side jamb to prevent the door panel from rotating.

One or more embodiments of the packaged prehung door systems described herein may include a deadbolt assembly installed in the interior volume (as, e.g., part of a multi-point latching system including upper and lower latches extending). The panel clips of the latch edge retainer apparatus may include a lock aperture configured for use with the deadbolt such that extension of the deadbolt from the latch edge of the door panel into a deadbolt cavity in a latch side jamb can be used to retain the panel clip in place between the latch edge and the latch side jamb and prevent the door panel from rotating about the hinge axis of the door system.

The latch edge retainer apparatus can provide a number of advantages including holding the door panel in position in a frame without requiring access to the backside of the latch side jamb (where the backside of the left side jamb is the surface of the left side jamb facing away from the door panel).

In one or more embodiments, the panel clip includes an edge plate positioned on the latch edge of the door panel, with the edge plate having a thickness selected to provide the proper reveal between the left side jamb and the latch edge of the door panel.

In one or more embodiments, the panel clip does not extend to an exterior face of the door panel and is, instead, limited to the interface between latch edge of the door panel and the interior face of the door panel. As a result, the panel clip does not compress or otherwise interfere with weatherstripping typically located along a stop attached to the left side jamb proximate the junction between the exterior face and latch edge of the door panel. Deformation of the weatherstripping may be an issue when that deformation becomes permanent and may affect the integrity of the seals formed between the door panel and the frame. Regardless of the limited portion of the door panel occupied by the panel clip, the panel clip remains secured in place by the interlock formed between the lock plug and the panel clip.

Similarly, one or more embodiments of the bottom edge spacer assemblies also do not extend to the exterior face of the door panel to limit any compression or other deformation of weatherstripping located along the junction between the bottom edge and exterior face of a door panel. As discussed above, deformation of any weatherstripping may be an issue when that deformation becomes permanent.

In a first aspect, one or more embodiments of a packaged prehung door system as described herein includes: a door system frame comprising a hinge side jamb, a latch side jamb, and a sill extending between a sill end of the hinge side jamb and a sill end of the latch side jamb; a panel comprising a hinge edge attached to the hinge side jamb and a latch edge facing the latch side jamb, the panel comprising a pair of faces spaced apart from each other and extending from the hinge edge to the latch edge, the panel configured to rotate relative to the hinge side jamb about a hinge axis aligned with the hinge side jamb; a lockset bore extending through the panel along a lockset bore axis oriented transverse to the hinge axis; a latch bore extending through the panel along a latch axis extending from the lockset bore through the latch edge along a latch axis, wherein the latch axis is transverse to the hinge axis and the lockset bore axis; and a latch edge retainer apparatus configured to retain the latch edge of the panel in alignment with the latch side jamb. The latch edge retainer apparatus includes: a panel clip comprising an edge plate and a face plate attached to each other along a common edge, wherein the edge plate and the face plate are oriented transverse to each such that when the edge plate is positioned on the latch edge of the panel, the face plate is positioned on a face of the panel and the common edge is proximate a corner formed at a junction between the latch edge and the face of the panel; a lock aperture located in the edge plate, the lock aperture defined by a pair of aperture edges; and a lock plug comprising a plug body extending along a plug axis, wherein the plug body comprises a bore portion and a latch portion aligned along the plug axis; wherein, when the edge plate of the panel clip is located between the latch edge of the panel and the latch side jamb such that the lock aperture is aligned with the latch bore, the face plate is located on a selected face of the panel; and wherein, when the bore portion of the lock plug is positioned in the latch bore such that the latch portion protrudes from the latch edge of the panel, the latch portion of the lock plug extends into a latch cavity facing the latch edge such that rotation of the panel is prevented by interference between the latch portion of the lock plug and the latch cavity.

In one or more embodiments of the packaged prehung door systems described herein, the latch cavity is located in the latch side jamb.

In one or more embodiments of the packaged prehung door systems described herein, the panel comprises an active panel and wherein the packaged prehung door system comprises a passive panel located between the latch edge of the active panel and the latch side jamb, wherein the passive panel comprises a passive panel latch edge facing the latch edge of the active panel and a passive panel hinge edge facing the latch side jamb, the passive panel attached to the latch side jamb and configured to rotate relative to the latch side jamb about a latch side jamb axis aligned with the latch side jamb; wherein the latch cavity is located in the passive panel latch edge, and wherein the latch edge retainer apparatus is configured to retain the latch edge of the active panel in alignment with the passive panel latch edge. In one or more embodiments, the edge plate comprises a selected edge plate thickness measured along the latch bore, wherein the selected edge plate thickness comprises a desired spacing between the latch edge of the active panel and the passive panel latch edge.

In one or more embodiments of the packaged prehung door systems described herein, the lock plug comprises a locking channel at a junction between the bore portion and the latch portion, wherein at least one aperture edge of the lock aperture is located in the locking channel when the edge plate of the panel clip is located between the latch edge of the panel and the latch side jamb and the bore portion of the lock plug is positioned in the latch bore such that the latch portion protrudes from the latch edge of the panel. In one or more embodiments, the lock plug is in a locked configuration when the aperture edge is located in the locking channel, and wherein the lock plug is configured to move from the locked configuration to an unlocked configuration in which the aperture edge is not located in the locking channel, wherein the lock plug rotates in the latch bore about the plug axis when moving between the locked configuration and the unlocked configuration.

In one or more embodiments of the packaged prehung door systems described herein, the lock aperture in the edge plate comprises a slot that comprises an opening along a free edge of the edge plate, wherein the pair of aperture edges of the lock aperture extend from the free edge towards the common edge of the panel clip.

In one or more embodiments of the packaged prehung door systems described herein, the bore portion comprises a maximum cross-plug bore dimension measured transverse to the plug axis and the latch portion comprises a maximum cross-plug latch dimension measured transverse to the plug axis, wherein the maximum cross-plug bore dimension is greater than the maximum cross-plug latch dimension.

In one or more embodiments of the packaged prehung door systems described herein, the bore portion comprises a maximum cross-plug bore dimension measured transverse to the plug axis and wherein the latch bore comprises a latch bore diameter measured transverse to the latch axis, wherein the maximum cross-plug bore dimension is greater than or equal to the latch bore diameter.

In one or more embodiments of the packaged prehung door systems described herein, the edge plate comprises a selected edge plate thickness measured along the latch bore, wherein the selected edge plate thickness comprises a desired spacing between the latch edge of the panel and the latch side jamb.

In one or more embodiments of the packaged prehung door systems described herein, the panel comprises a bottom edge extending between the latch edge and the hinge edge, the bottom edge also extending between the pair of faces of the panel, and wherein the bottom edge of the panel comprises spacer channel extending along a length of the bottom edge from the latch edge to the hinge edge, and wherein the assembly further comprises: a hinge side panel spacer comprising a channel plug retained in the spacer channel and a corner guide positioned proximate a corner formed by the hinge edge, bottom edge, and one face of the panel; and a sill spacer retained on the sill between the channel plug and the sill.

In one or more embodiments of the packaged prehung door systems including a hinge side panel spacer and a sill spacer as described herein, the corner guide comprises an edge tab spaced at a selected distance from the channel plug such that when the edge tab is placed against the hinge edge, the channel plug is in a selected position in the spacer channel on the bottom edge of the panel. In one or more embodiments. the edge tab is positioned proximate a junction between the face of the panel on which the faceplate is positioned and the hinge edge.

In one or more embodiments of the packaged prehung door systems described herein, the panel comprises a bottom edge extending between the latch edge and the hinge edge, the bottom edge also extending between the pair of faces of the panel, and wherein the bottom edge of the panel comprises spacer channel extending along a length of the bottom edge from the latch edge to the hinge edge, and the assembly further comprises: a latch side panel spacer comprising a latch side channel plug retained in the spacer channel and a latch side corner guide positioned proximate a corner formed by the hinge edge, bottom edge, and one face of the panel; and a latch side sill spacer retained on the sill between the latch side channel plug and the sill.

In one or more embodiments of the packaged prehung door systems including a hinge side panel spacer and a sill spacer as described herein, the latch side corner guide comprises an edge tab spaced at a selected distance from the latch side channel plug such that when the edge tab of the latch side panel spacer is placed against the latch edge, the latch side channel plug is in a selected position in the spacer channel on the bottom edge of the panel. In one or more embodiments, the edge tab of the latch side panel spacer is positioned proximate a junction between the face of the panel on which the faceplate is positioned and the latch edge of the panel. In one or more embodiments, the latch side panel spacer comprises a foot bolt aperture located between the latch side channel plug and the latch side corner guide.

In a second aspect, one or more embodiments of a packaged prehung door system comprising: a door system frame comprising a hinge side jamb, a latch side jamb, and a sill extending between a sill end of the hinge side jamb and a sill end of the latch side jamb; a panel comprising a hinge edge attached to the hinge side jamb and a latch edge facing the latch side jamb, the panel comprising a pair of faces spaced apart from each other and extending from the hinge edge to the latch edge, the panel configured to rotate relative to the hinge side jamb about a hinge axis aligned with the hinge side jamb; a deadbolt assembly installed in the panel, the deadbolt assembly comprising a deadbolt configured to extend from and retract into the latch edge of the panel; and a latch edge retainer apparatus configured to retain the latch edge of the panel in alignment with the latch side jamb. In one or more embodiments, the latch edge retainer apparatus includes: a panel clip comprising an edge plate and a face plate attached to each other along a common edge, wherein the edge plate and the face plate are oriented transverse to each such that when the edge plate is positioned on the latch edge of the panel, the face plate is positioned on a face of the panel and the common edge is proximate a corner formed at a junction between the latch edge and the face of the panel; and a lock aperture located in the edge plate; wherein, when the edge plate of the panel clip is located between the latch edge of the panel and the latch side jamb, the face plate is located on a selected face of the panel; and wherein, when the deadbolt is extended from the latch edge of the panel, the deadbolt extends through the lock aperture into a deadbolt cavity facing the latch edge such that rotation of the panel is prevented by interference between the deadbolt and the deadbolt cavity.

In one or more embodiments of the packaged prehung door systems described herein, the deadbolt cavity is located in the latch side jamb.

In one or more embodiments of the packaged prehung door systems described herein, the panel comprises an active panel and wherein the packaged prehung door system comprises a passive panel located between the latch edge of the active panel and the latch side jamb, wherein the passive panel comprises a passive panel latch edge facing the latch edge of the active panel and a passive panel hinge edge facing the latch side jamb, the passive panel attached to the latch side jamb and configured to rotate relative to the latch side jamb about a latch side jamb axis aligned with the latch side jamb; wherein the deadbolt cavity is located in the passive panel latch edge; and wherein the latch edge retainer apparatus is configured to retain the latch edge of the active panel in alignment with the passive panel latch edge. In one or more embodiments, the edge plate comprises a selected edge plate thickness measured along a bolt axis oriented transverse to the hinge axis, wherein the selected edge plate thickness comprises a desired spacing between the latch edge of the active panel and the passive panel latch edge.

In one or more embodiments of the packaged prehung door systems according to the second aspect as described herein, the edge plate comprises a selected edge plate thickness measured along a bolt axis oriented transverse to the hinge axis, wherein the selected edge plate thickness comprises a desired spacing between the latch edge of the panel and the latch side jamb.

In one or more embodiments of the packaged prehung door systems according to the second aspect as described herein, the deadbolt assembly comprises a deadbolt actuator located in an interior volume of the panel, wherein the interior volume is located between the pair of faces of the panel, wherein the deadbolt actuator is configured to move the deadbolt into and out of the interior volume of the panel when manipulated.

In one or more embodiments of the packaged prehung door systems according to the second aspect as described herein, the system comprises a latchbolt assembly installed in the panel, the latchbolt assembly comprising a latch configured to extend from and retract into the latch edge of the panel. In one or more embodiments, the latchbolt assembly comprises a latchbolt actuator located in an interior volume of the panel, wherein the interior volume is located between the pair of faces of the panel, wherein the latchbolt actuator is configured to move the latchbolt into and out of the interior volume of the panel when manipulated.

In one or more embodiments of the packaged prehung door systems according to the second aspect as described herein, the panel comprises a bottom edge extending between the latch edge and the hinge edge, the bottom edge also extending between the pair of faces of the panel, and wherein the bottom edge of the panel comprises spacer channel extending along a length of the bottom edge from the latch edge to the hinge edge, and the assembly further comprises: a hinge side panel spacer comprising a channel plug retained in the spacer channel and a corner guide positioned proximate a corner formed by the hinge edge, bottom edge, and one face of the panel; and a sill spacer retained on the sill between the channel plug and the sill. In one or more embodiments, the corner guide comprises an edge tab spaced at a selected distance from the channel plug such that when the edge tab is placed against the hinge edge, the channel plug is in a selected position in the spacer channel on the bottom edge of the panel. In one or more embodiments, the edge tab is positioned proximate a junction between the face of the panel on which the faceplate is positioned and the hinge edge.

In one or more embodiments of the packaged prehung door systems according to the second aspect as described herein, the panel comprises a bottom edge extending between the latch edge and the hinge edge, the bottom edge also extending between the pair of faces of the panel, and wherein the bottom edge of the panel comprises spacer channel extending along a length of the bottom edge from the latch edge to the hinge edge, and the assembly further comprises: a latch side panel spacer comprising a latch side channel plug retained in the spacer channel and a latch side corner guide positioned proximate a corner formed by the hinge edge, bottom edge, and one face of the panel; and a latch side sill spacer retained on the sill between the latch side channel plug and the sill. In one or more embodiments, the latch side corner guide comprises an edge tab spaced at a selected distance from the latch side channel plug such that when the edge tab of the latch side panel spacer is placed against the latch edge, the latch side channel plug is in a selected position in the spacer channel on the bottom edge of the panel. In one or more embodiments, the edge tab of the latch side panel spacer is positioned proximate a junction between the face of the panel on which the faceplate is positioned and the latch edge of the panel. In one or more embodiments, the latch side panel spacer comprises a foot bolt aperture located between the latch side channel plug and the latch side corner guide.

In a third aspect, one or more embodiments of a method of maintaining squareness of a prehung door system as described herein includes: installing a latch edge retainer apparatus on and between a latch edge of a panel and a latch side jamb; installing a hinge side bottom edge spacer assembly between a bottom edge of the panel and a top of a sill attached to a hinge side jamb to which a hinge edge of the panel is attached; and installing a latch side bottom edge spacer assembly between the bottom edge of the panel and the top of the sill, wherein the latch side bottom edge spacer assembly is closer to the latch edge of the panel than the hinge side bottom edge spacer assembly.

In one or more embodiments of a method of maintaining squareness of a prehung door system as described herein, the hinge side bottom spacer assembly and the latch side bottom edge spacer assembly comprise a bottom edge spacer assembly height that matches a nominal distance between the bottom edge of the panel and the top of the sill.

In one or more embodiments of a method of maintaining squareness of a prehung door system as described herein, the hinge side bottom spacer assembly and the latch side bottom edge spacer assembly comprise a bottom edge spacer assembly height selected to provide support at least a portion of a mass of the panel on the sill when the sill of the prehung door system is positioned on a level surface.

In one or more embodiments of a method of maintaining squareness of a prehung door system as described herein, the method comprises removing the latch edge retainer apparatus, the latch side bottom edge spacer, and the hinge side bottom edge spacer only after attaching the latch side jamb and the hinge side jamb in a building opening.

In one or more embodiments of a method of maintaining squareness of a prehung door system as described herein, the sill comprises a sill having a fixed sill height.

In one or more embodiments of a method of maintaining squareness of a prehung door system as described herein, the panel comprises a lockset bore extending through the panel along a lockset bore axis oriented transverse to the hinge axis and a latch bore extending through the panel along a latch axis extending from the lockset bore through the latch edge along a latch axis, wherein the latch axis is transverse to the hinge axis and the lockset bore axis; and the latch edge retainer apparatus is configured to retain the latch edge of the panel in alignment with the latch side jamb. In one or more embodiments, the latch edge retainer apparatus includes: a panel clip comprising an edge plate and a face plate attached to each other along a common edge, wherein the edge plate and the face plate are oriented transverse to each such that when the edge plate is positioned on the latch edge of the panel, the face plate is positioned on a face of the panel and the common edge is proximate a corner formed at a junction between the latch edge and the face of the panel; a lock aperture located in the edge plate, the lock aperture defined by a pair of aperture edges, and a lock plug comprising a plug body extending along a plug axis, wherein the plug body comprises a bore portion and a latch portion aligned along the plug axis. Installing the latch edge retainer comprises: locating the edge plate of the panel clip between the latch edge of the panel and the latch side jamb such that the lock aperture is aligned with the latch bore and the face plate is located on a selected face of the panel; and inserting the lock plug into the latch bore such that the bore portion of the lock plug is positioned in the latch bore and the latch portion protrudes from the latch edge of the panel into a latch cavity in the latch side jamb such that rotation of the panel is prevented by interference between the latch portion of the lock plug and the latch cavity in the latch side jamb.

In one or more embodiments of a method of maintaining squareness of a packaged prehung door system as described herein, the panel comprises an active panel and the packaged prehung door system comprises a passive panel located between the latch edge of the active panel and the latch side jamb, wherein the passive panel comprises a passive panel latch edge facing the latch edge of the active panel and a passive panel hinge edge facing the latch side jamb, the passive panel attached to the latch side jamb and configured to rotate relative to the latch side jamb about a latch side jamb axis aligned with the latch side jamb. The active panel comprises a lockset bore extending through the active panel along a lockset bore axis oriented transverse to the hinge axis and a latch bore extending through the active panel along a latch axis extending from the lockset bore through the latch edge along a latch axis, wherein the latch axis is transverse to the hinge axis and the lockset bore axis. The latch edge retainer apparatus is configured to retain the latch edge of the active panel in alignment with the latch side jamb and the passive panel latch edge, the latch edge retainer apparatus comprising: a panel clip comprising an edge plate and a face plate attached to each other along a common edge, wherein the edge plate and the face plate are oriented transverse to each such that when the edge plate is positioned on the latch edge of the active panel, the face plate is positioned on a face of the active panel and the common edge is proximate a corner formed at a junction between the latch edge and the face of the active panel, a lock aperture located in the edge plate, the lock aperture defined by a pair of aperture edges, and a lock plug comprising a plug body extending along a plug axis, wherein the plug body comprises a bore portion and a latch portion aligned along the plug axis. Installing the latch edge retainer comprises: locating the edge plate of the panel clip between the latch edge of the active panel and the passive panel latch edge such that the lock aperture is aligned with the latch bore and the face plate is located on a selected face of the active panel, and inserting the lock plug into the latch bore such that the bore portion of the lock plug is positioned in the latch bore and the latch portion protrudes from the latch edge of the active panel into a latch cavity in the passive panel latch edge such that rotation of the panel is prevented by interference between the latch portion of the lock plug and the latch cavity.

In one or more embodiments of a method of maintaining squareness of a prehung door system as described herein, the panel comprises a deadbolt assembly installed in the panel, the deadbolt assembly comprising a deadbolt configured to extend from and retract into the latch edge of the panel; and the latch edge retainer apparatus is configured to retain the latch edge of the panel in alignment with the latch side jamb. In one or more embodiments, the latch edge retainer apparatus includes: a panel clip comprising an edge plate and a face plate attached to each other along a common edge, wherein the edge plate and the face plate are oriented transverse to each such that when the edge plate is positioned on the latch edge of the panel, the face plate is positioned on a face of the panel and the common edge is proximate a corner formed at a junction between the latch edge and the face of the panel; and a lock aperture located in the edge plate. Installing the latch edge retainer apparatus comprises: positioning the edge plate of the panel clip on the latch side jamb between the latch edge of the panel such that the deadbolt is aligned with the lock aperture and locating the face plate on a selected face of the panel; and extending the deadbolt from the latch edge of the panel after positioning the deadbolt in alignment with a deadbolt cavity on the latch side jamb such that rotation of the panel is prevented by interference between the deadbolt and the deadbolt cavity in the latch side jamb.

In one or more embodiments of a method of maintaining squareness of a prehung door system as described herein, wherein the panel comprises an active panel and the packaged prehung door system comprises a passive panel located between the latch edge of the active panel and the latch side jamb, wherein the passive panel comprises a passive panel latch edge facing the latch edge of the active panel and a passive panel hinge edge facing the latch side jamb, the passive panel attached to the latch side jamb and configured to rotate relative to the latch side jamb about a latch side jamb axis aligned with the latch side jamb. The active panel comprises a deadbolt assembly installed in the active panel, the deadbolt assembly comprising a deadbolt configured to extend from and retract into the latch edge of the active panel. The latch edge retainer apparatus is configured to retain the latch edge of the panel in alignment with the latch side jamb, the latch edge retainer apparatus comprising: a panel clip comprising an edge plate and a face plate attached to each other along a common edge, wherein the edge plate and the face plate are oriented transverse to each such that when the edge plate is positioned on the latch edge of the active panel, the face plate is positioned on a face of the active panel and the common edge is proximate a corner formed at a junction between the latch edge and the face of the active panel, and a lock aperture located in the edge plate. Installing the latch edge retainer apparatus comprises: positioning the edge plate of the panel clip on the latch edge of the active panel such that the deadbolt is aligned with the lock aperture and locating the face plate on a selected face of the active panel, and extending the deadbolt from the latch edge of the active panel after positioning the deadbolt in alignment with a deadbolt cavity in the passive panel latch edge such that rotation of the active panel is prevented by interference between the deadbolt and the deadbolt cavity.

Where used herein, positional terms such as “top,” “bottom,” “above,” “below,” etc. are used for reference relative to each other when the packaged prehung door systems described herein are installed in a building opening. These terms should not be construed narrowly and may in actual use, be reversed. For example, a first component described as being above a second component may in actual use, be located below the second component. Furthermore, in one or more embodiments, components described as, e.g., side jambs, head jambs, sills, etc. may be found in any orientation of the door systems described herein. For example, components described as a side jamb may in one or more embodiments, be found at the top or bottom of a door system as installed while the head jamb and still of the door system are found on the sides of the door system as installed. Such relational terms are used only out of convenience and should not be construed as limiting the claims.

Where used herein, the terms “exterior” and “interior” are used in a relative sense, for example, an exterior surface and an interior surface may be used to describe surfaces located on opposite sides of a door system. In actual use, and exterior surface could be found within the interior of a building or other structure where the surface would conventionally be defined as an interior surface, while an interior surface could be found outside of a building or other structure where the surface would conventionally be defined as an exterior surface.

As used herein and in the appended claims, the singular forms “a,” “an,” and “the” include plural referents unless the context clearly dictates otherwise. Thus, for example, reference to “a” or “the” component may include one or more of the components and equivalents thereof known to those skilled in the art. Further, the term “and/or” means one or all of the listed elements or a combination of any two or more of the listed elements.

It is noted that the term “comprises” and variations thereof do not have a limiting meaning where these terms appear in the accompanying description. Moreover, “a,” “an,” “the,” “at least one,” and “one or more” are used interchangeably herein.

The above summary is not intended to describe each embodiment or every implementation of the packaged prehung door systems and related methods as described herein. Rather, a more complete understanding of the invention will become apparent and appreciated by reference to the following Description of Illustrative Embodiments and claims in view of the accompanying figures of the drawing.

BRIEF DESCRIPTION OF THE VIEWS OF THE DRAWING

Each of the figures described herein include axes corresponding to a three-dimensional Cartesian coordinate system to facilitate an understanding of the illustrative embodiments of the invention depicted in the figures and described herein.

DESCRIPTION OF ILLUSTRATIVE EMBODIMENTS

Figure 1:
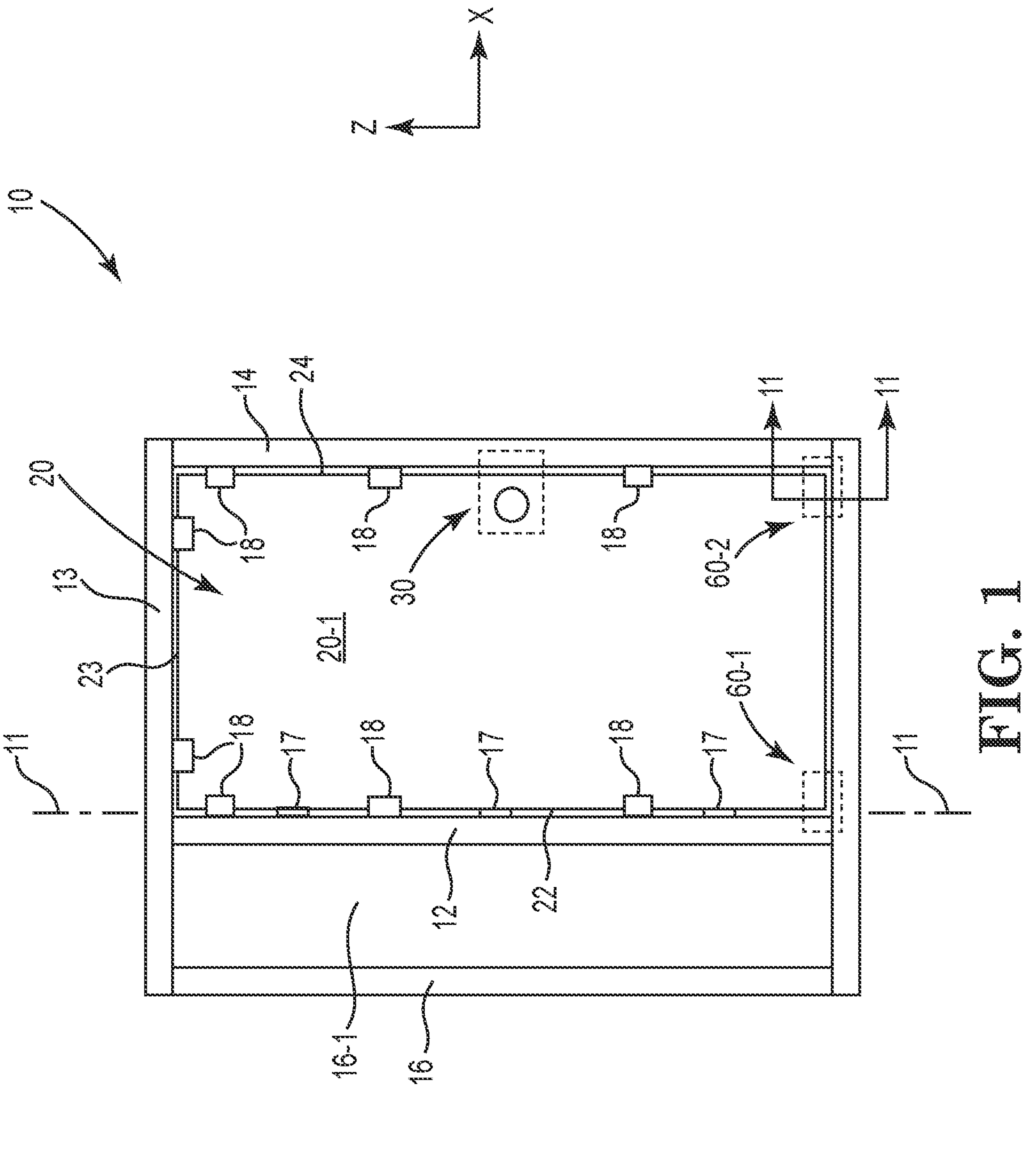
FIG. 1 depicts one illustrative embodiment of a packaged prehung door system as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

FIG. 1 depicts one illustrative embodiment of a packaged prehung door system as described herein. The depicted prehung door system 10 includes a frame having a hinge side jamb 12, a head jamb 13, a latch side jamb 14, and a sill 15. The depicted embodiment of door system 10 also includes an integrated sidelight having a side jamb 16 spaced apart from the hinge side jamb 12 as well as a panel 16-1 located between the side jamb 16 and hinge side jamb 12. In some cases, hinge side jamb 12 may be referred to as a mull post but for purposes of this invention, any side jamb to which door panel hinges are attached will be referred to as a hinge side jamb.

The depicted fenestration unit is only one example of the fenestration units that may be provided as packaged prehung door systems as described herein. Other examples of prehung door systems that may be provided as packaged prehung door systems as described herein include single panel prehung door systems (i.e., a door system as in FIG. 1 with no sidelight), multi-panel prehung door systems including two or more door panels and one or more mull posts, etc.

Door panel 20 is located between hinge side jamb 12 and latch side jamb 14 and is connected to hinge side jamb 12 by hinges 17. The door panel 20 is configured to rotate about a hinge axis 11 that is generally aligned with the hinge side jamb 12. The door panel 20 includes a hinge edge 22 facing the hinge side jamb 12 when the door panel 20 is in a closed configuration within the frame. Door panel 20 also includes a latch edge 24 facing the latch side jamb 14, a top edge 23 facing the head jamb 13, and a bottom edge 25 facing the sill 15.

The depicted illustrative embodiment of the packaged prehung door system depicted in FIG. 1 also includes an optional hinge side bottom edge spacer assembly 60-1 positioned proximate the junction between the hinge edge 22 and the bottom edge 25 of the door panel 20 as well as an optional latch side bottom edge spacer assembly 60-2 position proximate the junction between the latch edge 24 and the bottom edge 25 of the door panel 20. The bottom edge spacer assemblies can assist in maintaining proper spacing between the bottom edge 25 and sill 15.

The depicted illustrative embodiment of door system 10 includes a variety of optional spacers 18 positioned between the hinge side jamb 12 and hinge edge 22 of door panel 20, between the latch side jamb 14 and latch edge 24 of the door panel 20, and between the top edge 23 and head jamb 13.

In one or more embodiments of the packaged prehung door systems described herein, the face 20-1 of door panel 20 is an interior face and none of the packaging system components extend past the hinge edge 22, top edge 23, latch edge 24, or bottom edge 25 to the exterior face of the door panel 20. Limiting the packaging system components to the interior face 20-1 and hinge edge 22 or latch edge 24 of the door panel 20 can, in one or more embodiments, limit or prevent any deformation of weatherstripping installed on the door system at the junction between the exterior face of the door panel 20 and any stops attached to the jambs.

One or more embodiments of the packaged prehung door systems described herein that include a latch edge retainer apparatus and bottom edge spacer assemblies proximate both the hinge and latch edges of the door panels may provide a packaged prehung door system that leverages the squareness of the door panel to square the frame. In particular, the packaged prehung door systems can maintain squareness of the door frame during both transport and during installation.

In one or more embodiments, the latch edge retainer apparatus and bottom spacer assemblies, along with the hinges, keep the side jambs parallel with each other and, because the bottom edges of door panels are typically carefully controlled to form right angles with the hinge and latch edges of the door panel, the side jambs are also squared to the sill.

In one or more embodiments, the bottom edge spacer assemblies described herein are configured to carry at least a portion of, and in some cases all or nearly all, the weight of the door panel and to transfer that load to the sill. In doing so, the spacing between the bottom edge of the door panel and the sill can be carefully controlled and maintained. This may be particularly true in packaged prehung door systems that include sills with a fixed height. In one or more embodiments, the ability of the bottom edge spacer assemblies of the packaged prehung door systems described herein may be enhanced as the weight of the door panel increases—which is generally true for exterior doors, larger doors, doors with larger amounts of glass, etc.

To accomplish the weight transfer, it may be preferred that the bottom edge spacer assemblies occupy the entire distance or space between the bottom edge of the door panel and the sill (with adjustments for any components (e.g., sweeps, etc.) installed on the bottom edge of the door panel before the door panel is attached to the frame.

In one or more embodiments, the latch edge retainer apparatus described herein fix the spacing between the latch edge and the latch side jamb and prevent opening of the door panel during transportation and installation of the packaged prehung door systems described herein.

When prehung door systems are fitted with the bottom edge spacer assemblies (which keep the bottom edge of the door panel at a fixed distance above the sill) and the latch edge retainer apparatus (which keeps the door panel closed and fixes the spacing between the door panel and the latch side jamb) the packaged prehung door systems described herein (which also include hinges that fix the spacing between the hinge edge and the hinge side jamb) provide a robust packaging system that maintains squareness of the frame during both transport and installation.

Installation of the packaged prehung door systems described is, of course, facilitated if the frame includes installation holes/openings that can be accessed while leaving the bottom edge spacer assemblies and latch edge retainer apparatus in place during installation, with those components being removed only after the packaged prehung door system is secured within the building opening.

Figure 2B:
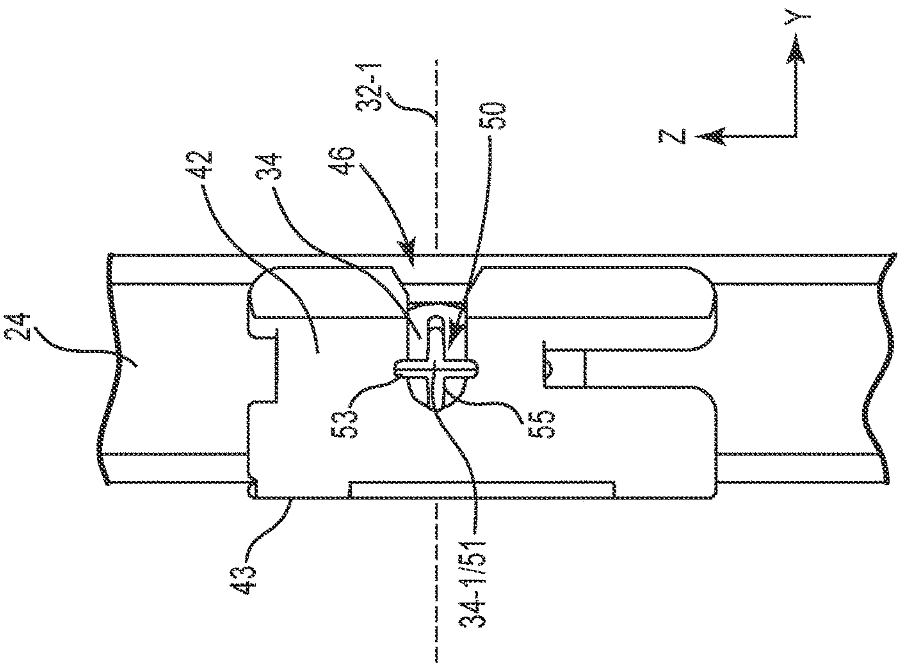
FIG. 2B is a view of the latch retainer apparatus of FIG. 2A when viewed along the X-axis (facing the latch edge of the door panel).
Figure 2A:
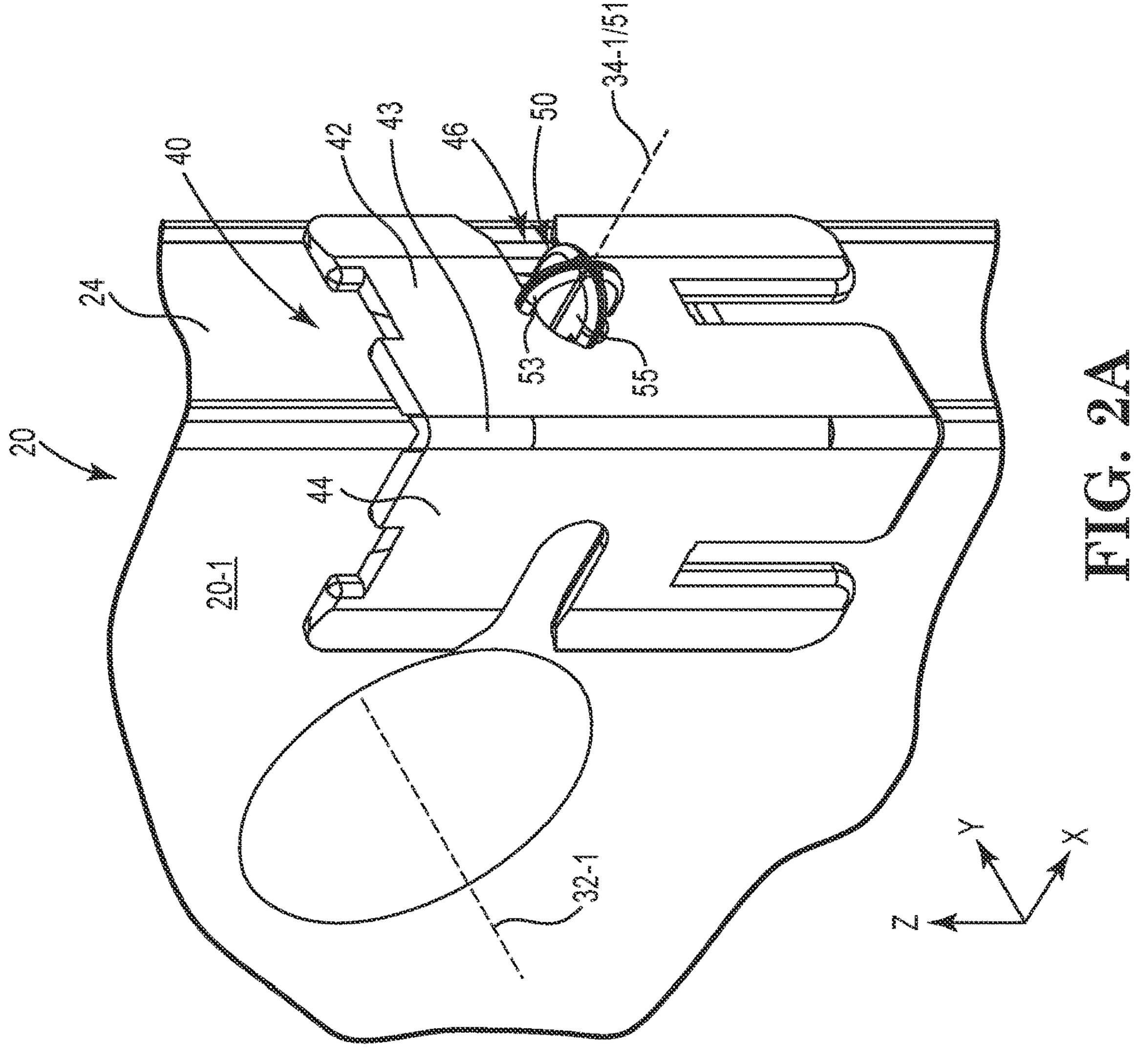
FIG. 2A is an enlarged perspective view of one illustrative embodiment of a latch retainer apparatus as described herein.

FIGS. 2A-4 depict one illustrative embodiment of a latch edge retainer apparatus configured to retain the latch edge of a panel in alignment with a latch side jamb as described herein. FIG. 2A is a perspective view of the illustrative latch edge retainer apparatus as installed on/in a door panel while FIG. 2B is a view of the latch edge 24 of the door along the X-axis (i.e., from a viewpoint facing the latch edge 24 of the door panel 20. The depicted portion of door panel 20 includes face 20-1 and the latched edge 24. A lockset bore 32 is formed through the door panel 20 such that the lockset bore 32 extends through both the (typically interior) face 20-1 as well as the face on the opposite face 20-2 (typically exterior) of the door panel 20. Lockset bore 32 may be described as being formed along a lockset bore axis 32-1 extending through the lockset bore 32. Typically, but not necessarily, lockset bore axis 32-1 is normal to the faces of door panel 20.

One end of a latch bore 34 is also depicted in FIG. 2B, with latch bore 34 extending through the latch edge 24 of door panel 20 into the lockset bore 32 along a latch axis 34-1. Typically, the latch axis 34-1 is transverse to both the hinge axis (see, e.g., hinge axis 11 in FIG. 1) and the latch axis 34-1 of a prehung door system as described herein.

The latch edge retainer apparatus includes a panel clip 40 and a lock plug 50. The panel clip includes an edge plate 42 and a faceplate 44 attached to each other along a common edge 43. The edge plate 42 and faceplate 44 are oriented transverse to each other such that when the edge plate 42 is positioned on the latch edge of a door panel (e.g., latch edge 24 of door panel 20) the faceplate 44 is positioned on a base 20-1 of door panel 20 and the common edge 43 is located proximate a corner formed at a junction between the latch edge 24 and face 20-1 of door panel 20.

As depicted in FIGS. 2A-2B, the edge plate 42 is positioned against the latch edge 24 of door panel 20 while faceplate 44 is positioned on the face 20-1 of door panel 20. The panel clip 40 includes an edge plate 42 having a length sufficient to span the latch edge 24 between face 20-1 and face 20-2 of door panel 20. Full coverage of the latch edge 24 by the edge plate 42 may not be required. In one or more embodiments, it may be preferred that the edge plate 42 not extend past the face 20-2 of door panel 22, as discussed herein, avoid interference with weatherstripping, etc.

Figure 3B:
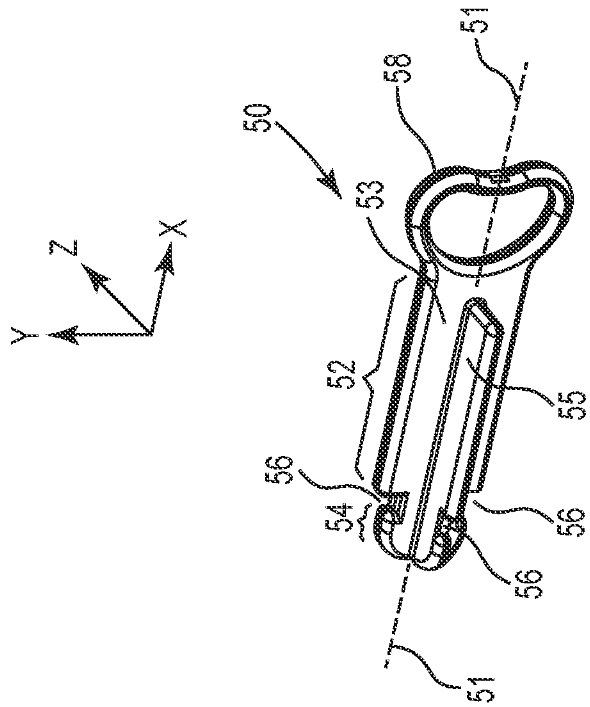
FIG. 3B is a perspective view of the lock plug of the latch retainer apparatus of FIG. 2A removed from the door panel.
Figure 3A:
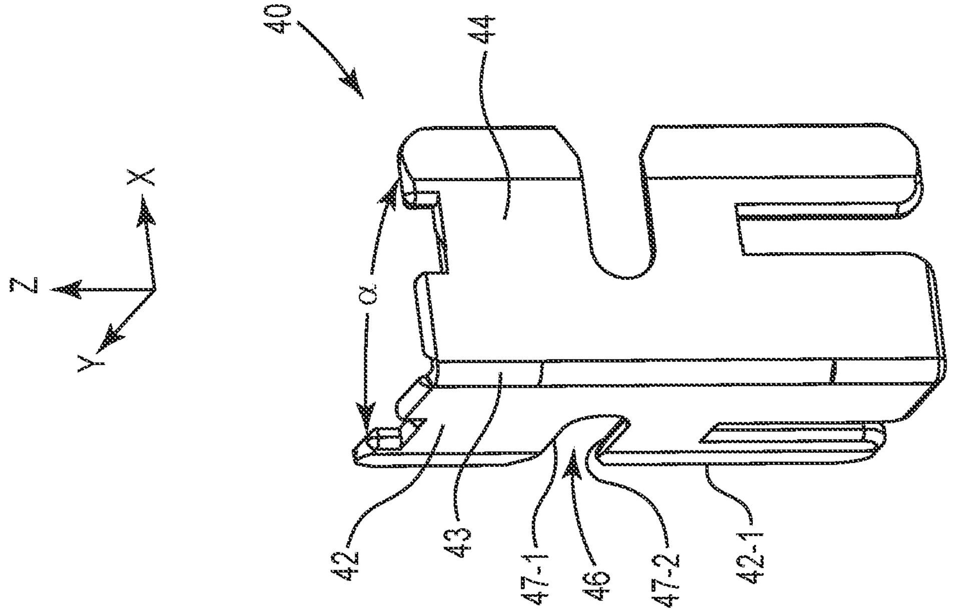
FIG. 3A is a perspective view of the panel clip of the latch retainer apparatus of FIG. 2A removed from the door panel.

With reference to FIG. 3A, typically, but not necessarily, the edge plate 42 and faceplate 44 of a panel clip of a latch edge retainer apparatus as described herein form an angle $\alpha$ (alpha) measured from the common edge that is a right angle although the angle $\alpha$ (alpha) should be selected to match the angle formed between the latch edge and face of the door panel on which the panel clip 40 is positioned.

The depicted illustrative embodiment of panel clip 40 also includes a lock aperture 46 located in edge plate 42. The illustrative embodiment of lock aperture 46 includes, with reference to FIG. 3A, edges 47-1 and 47-2 that define the lock aperture 46 in edge plate 42. In the depicted illustrative embodiment, lock aperture 46 of a slot having an opening along the free edge 42-1 of edge plate 42 although one or more alternative embodiments of lock apertures used in panel clips as described herein provided that they properly interface with the lock plug of latch edge retainer apparatus as described herein.

In the depicted illustrative embodiment, panel clip 40 includes an optional lock aperture in faceplate 44. Doing so allows panel clip 40 to be used on both left and right hand swinging doors.

Figure 4:
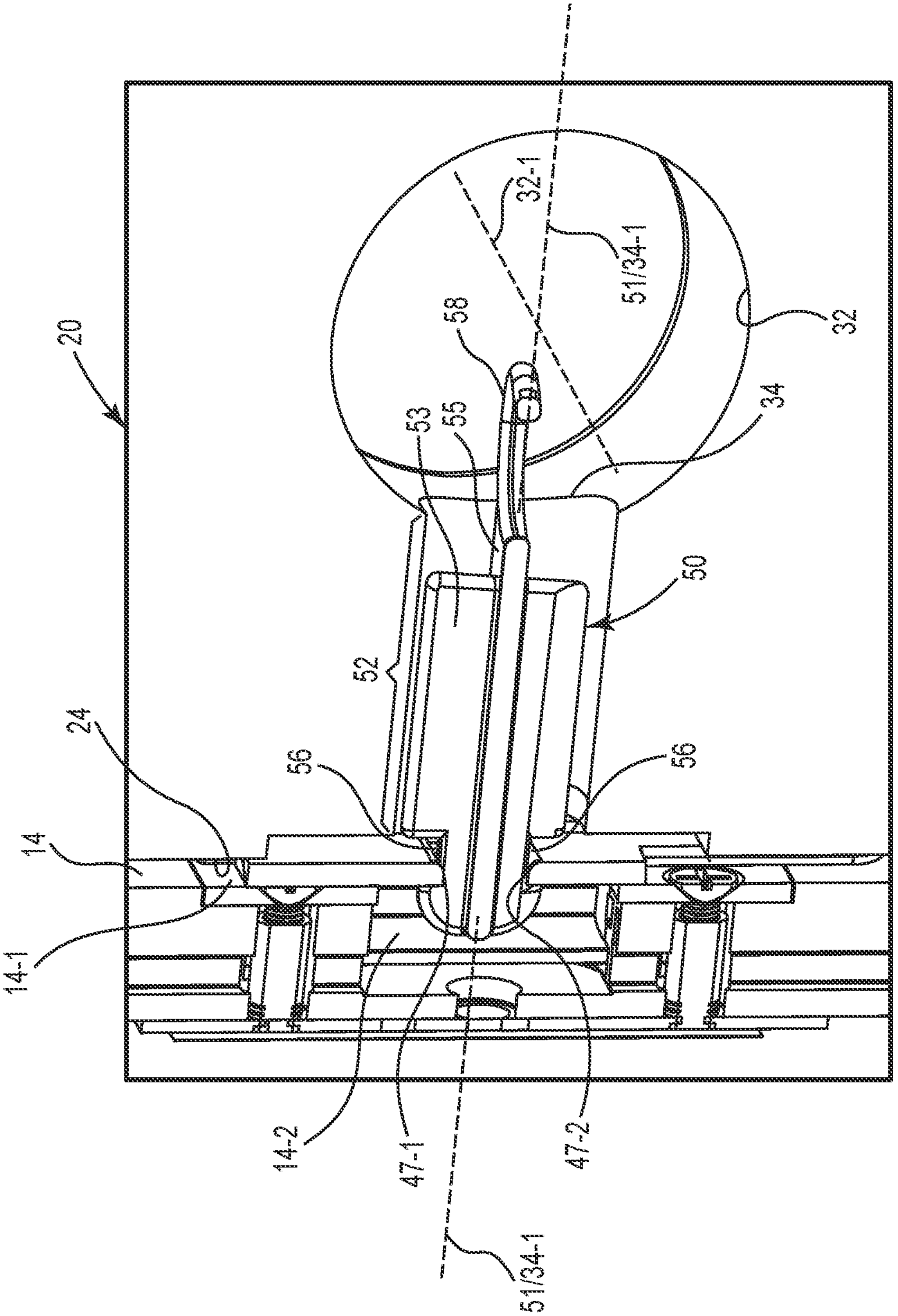
FIG. 4 is a cross-sectional view of the latch retainer apparatus as engaged with the door system in FIG. 2A, the cross-section taken generally along the X-Z plane.

One illustrative embodiment of a lock plug 50 that can be used in one illustrative embodiment of latch edge retainer apparatus as described herein is positioned in the latch bore 34 of door panel 20 in FIGS. 2A, 2B and 4 and is depicted in isolation in FIG. 3B. The lock plug 50 includes a plug body extending along a plug axis 51. The plug body includes a bore portion 52 and a latch portion 54 aligned along the plug axis 51. It should be noted that FIG. 4 includes the latch axis 34-1 which is typically coextensive with the plug axis 51 when the lock plug 50 is properly positioned in latch bore 34.

The depicted illustrative embodiment of lock plug 50 includes fins 53 and 55 which, in the depicted embodiment, are oriented generally transverse to each other about the lock plugs of latch edge retainer apparatus as described herein may take any suitable form, e.g., cylindrical, etc. The depicted illustrative embodiment of lock plug 50 also includes a handle 58 that may allow for convenient manipulation of the lock plug 50 during both insertion into the latch bore 34 and rotation as described herein.

Another feature of one or more embodiments of lock plugs of latch edge retainer apparatus as described herein is a locking channel at the junction between the bore portion 52 and the latch portion 54. In the depicted illustrative embodiment the locking channel takes the form of a pair of individual slots 56 formed in each of the fins 53 and 55 that, collectively, define a locking channel extending about the plug axis 51 when moving about the plug axis 51.

FIG. 4 is a cross-sectional view of the latch retainer apparatus as engaged with the door system in FIG. 2, the cross-section taken generally along the X-Z plane. As depicted in FIG. 4 the slots 56 in fin 53 of lock plug 50 engage the opposing aperture edges 47-1 and 47-2 of the lock aperture in edge plate 42.

Also depicted in FIG. 4 is the extension of latch portion 54 of lock plug 50 into latch cavity 14-2 provided in latch side jamb 14. As described herein the latch portion 54 of lock plug 50 protrudes from the latch edge 24 of the door panel 20 when the bore portion 52 of the lock plug 50 is properly positioned in the latch bore 34. Extension of the latch portion 54 of lock plug 50 into latch cavity 14-2 prevents rotation of the door panel 20 (about, e.g., hinge axis 11 in FIG. 1) due to interference between the latch portion 54 of lock plug 50 and the latch cavity 14-2 in the latch side jamb 14.

Because slots 56 of lock plug 50 can be described as defining one illustrative embodiment of a locking channel of a lock plug of a latch edge retainer apparatus as described herein, FIG. 4 can be described as depicting one illustrative embodiment in which at least one aperture edge of a lock aperture is located in the locking channel of a lock plug when the edge plate of a panel clip is located between the latch edge panel of a door panel and the latch side jamb and the bore portion of the lock plug is positioned in the latch bore such that the latch portion protrudes from the latch edge of door panel.

As depicted in FIG. 4, the lock plug 50 can be described as being in a locked configuration in which the aperture edges 47-1 and 47-2 are located in the locking channel defined by the slots 56 in fin 53 of lock plug 50. Rotation of the lock plug 50 about plug axis 51 can be used to move the lock plug 50 from the locked configuration to an unlocked configuration.

Figure 5A:
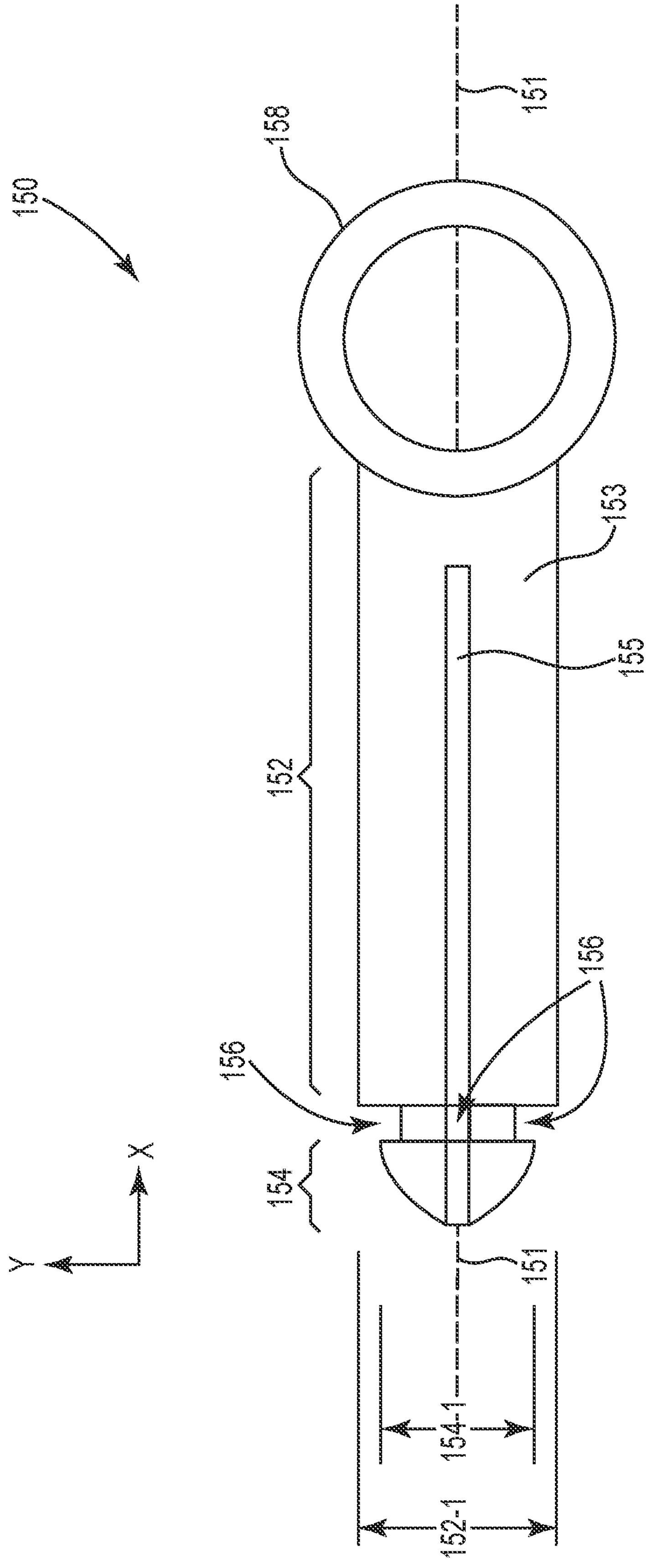
FIG. 5A is side view of another illustrative embodiment of a lock plug that may be used in one or more embodiments of the latch edge retainer apparatus described herein.
Figure 5C:
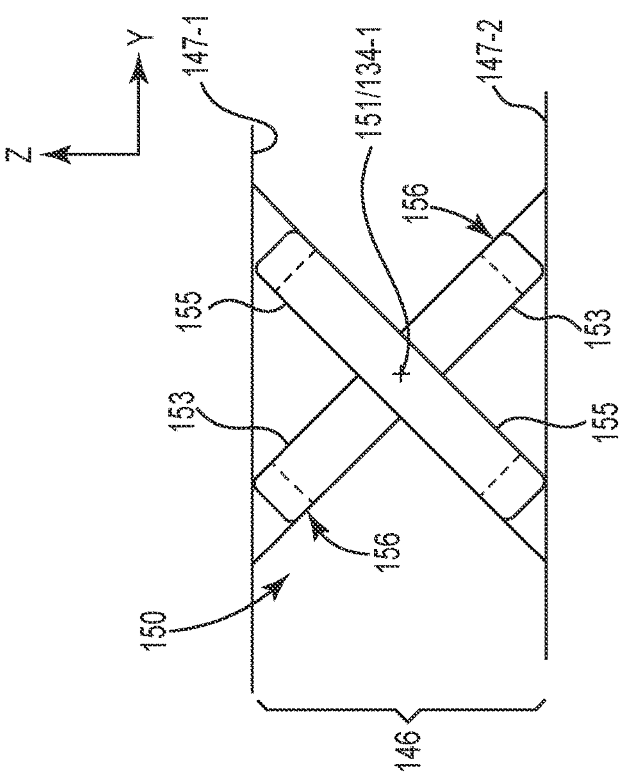
FIGS. 5B and 5C are end views of the lock plug of FIG. 5A viewed along the plug axis 151.
Figure 5B:
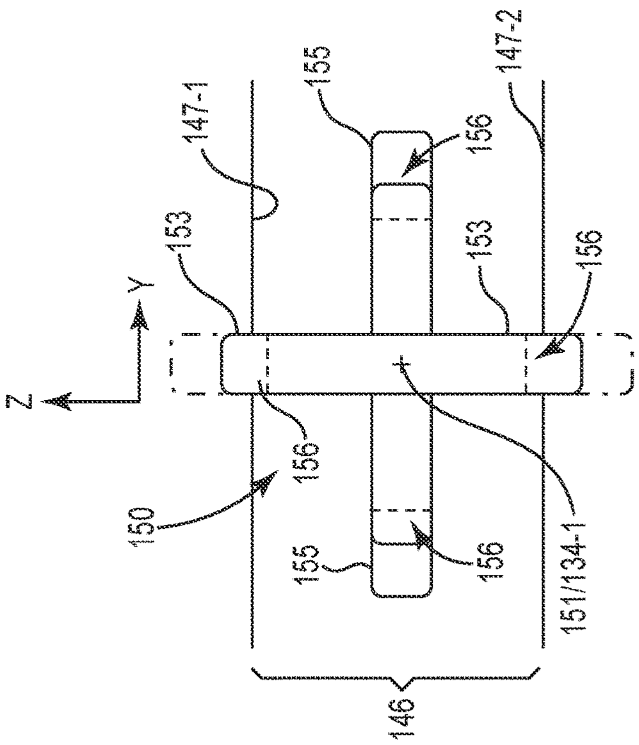

Another illustrative embodiment of a lock plug 150 is depicted in FIGS. 5A-5C. The lock plug 150 is depicted in isolation in FIG. 5A and includes a body having a bore portion 152 and a latch portion 154 along with slots 156 defining a locking channel between the bore portion 152 and latch portion 154. Similar to lock plug 50, lock plug 150 includes fins 153 and 155 that, together, define the body of the lock plug 150. Lock plug 150 also includes a handle 158.

Another feature depicted in FIG. 5A that may be found in one or more embodiments of lock plugs used in latch edge retainer apparatus as described herein are the relative dimensions of the bore portion and the latch portion. As depicted in FIG. 5A, bore portion 152 has a maximum cross-plug bore dimension 152-1 measured transverse to the plug axis 151 while the latch portion 154 has a maximum cross-plug latch dimension 154-1 also measured transverse to the plug axis 151. In one or more embodiments of lock plugs as described herein, the maximum cross-plug bore dimension is greater than the maximum cross-plug latch dimension as illustrated in FIG. 5A.

In one or more embodiments of latch edge retainer apparatus including lock plugs as described herein, the maximum cross-plug bore dimension is preferably greater than the distance between the aperture edges defining the lock aperture in the edge plate of the panel clip. In terms of the illustrative embodiment depicted in FIGS. 5A-5B, the maximum cross-plug bore dimension 152-1 is greater than a distance between the aperture edges 147-1 and 147-2 as illustrated in FIG. 5B.

The different cross-plug dimensions may facilitate proper positioning of lock plugs of latch edge retainer apparatus as described herein. With reference to FIG. 5C, the lock plug 150 may be rotated about its axis 151 such that the latch portion 154 can pass through the aperture edges 147-1 and 147-2 of a lock aperture 146. After positioning the lock plug 150 such that the edges 147-1 and 147-2 of aperture 146 are aligned with slots 156, the lock plug 150 can be rotated about its axis 151 to an orientation as depicted in FIG. 5B (which corresponds to the orientation of lock plug 50 as depicted in FIG. 4).

The lock plug 150 can be described as being in an unlocked configuration in FIG. 5C and a locked configuration in FIG. 5B (which corresponds to the locked configuration of lock plug 50 as depicted in FIG. 4). When in the locked configuration, the lock plugs 150/50 cannot be moved along the plug axis 151/51 due to interference between the slots 156/56 defining the locking channels of lock plugs 150/50.

The use of fins in lock plugs as provided in latch edge retainer apparatus as described herein is only one embodiment of structures that may provide suitable dimensions to retain the latch edge of a panel in alignment with a latch side jamb as described herein. One (of many) alternative embodiment of a lock plug 250 is depicted in FIGS. 6A-6C.

Figure 6A:
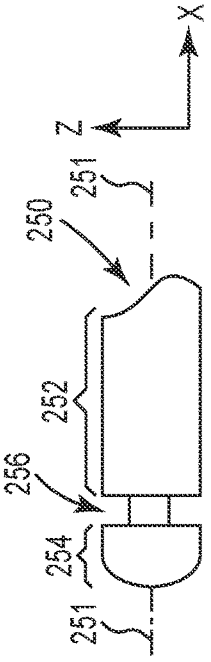
FIGS. 6A-6C depict one alternative illustrative embodiment of a lock plug that may be used in one or more embodiments of the packaged prehung door systems described herein.
Figure 6B:
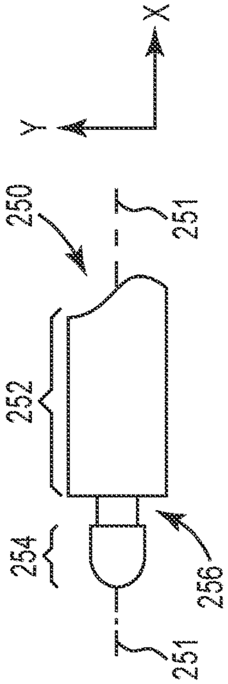
Figure 6C:
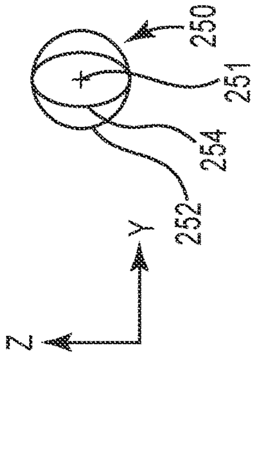

As depicted in FIG. 6A, a portion of lock plug 250 is depicted including a portion of the bore portion 252 and latch portion 254 along with a locking channel 256 located between bore portion 252 and latch portion 254. The latch portion 254 has a generally ovate shape when viewed along the plug axis 251. As a result, when viewed along the Y-axis as depicted in FIG. 6A, the latch portion 254 has a cross-plug dimension roughly equal to the cross-plug dimension of the bore portion 252. When viewed along the z-axis as depicted in FIG. 6B, however, the latch portion 254 has a cross-plug dimension that is narrower than the cross-plug dimension of the bore portion 252.

Those different dimensions allow for insertion of the latch portion 254 through a lock aperture of an edge plate of a panel clip of one or more embodiments of latch edge retainer apparatus as described herein with rotation of the plug 250 about its axis 251 moving the lock plug 250 from an unlocked configuration to a locked configuration.

As depicted in FIG. 1, one or more embodiments of the packaged prehung door systems described herein may include bottom edge spacer assemblies 60-1 and 60-2 on one or both of the hinge side and latch side of the door panel. Providing bottom edge spacer assemblies in combination with the latch edge retainer apparatus described herein may provide a system that offers robust securement of a door panel within a frame for shipping and, in some instances, may assist in retaining the frame square during installation of the prehung door system in a building opening.

Figure 7:
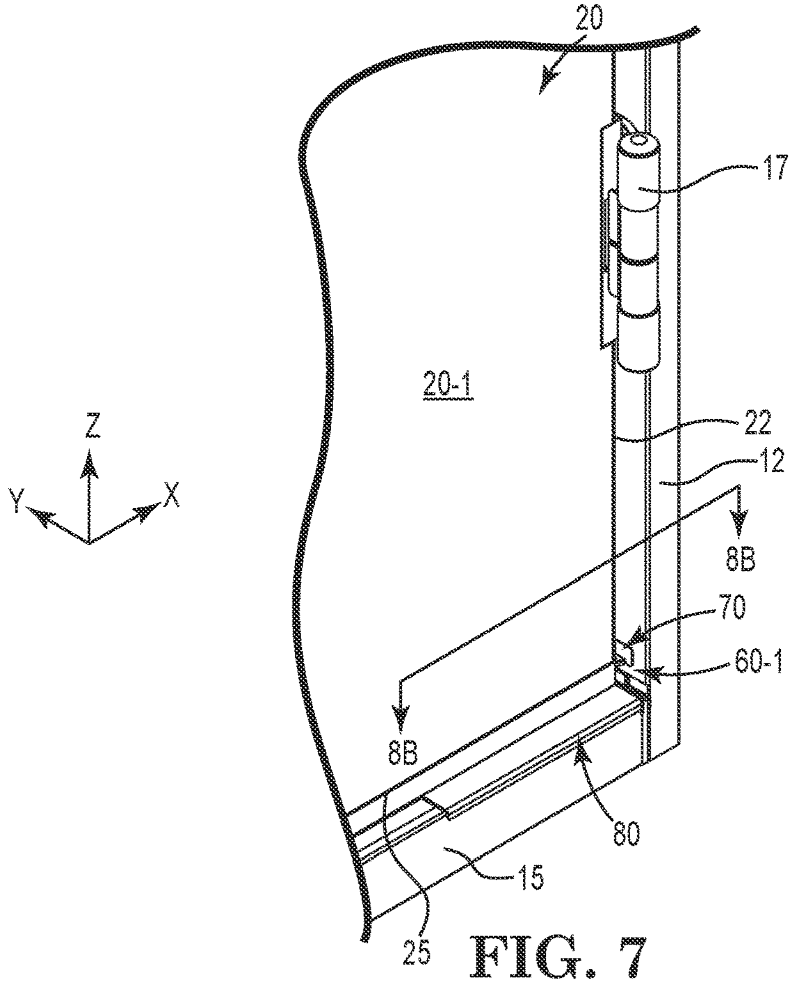
FIG. 7 is a perspective view of the junction between the hinge side jamb, sill and door panel including one illustrative embodiment of a hinge side panel spacer and sill spacer as described herein installed.

One illustrative embodiment of a bottom edge spacer assembly 60-1 located on the hinge side of a door panel is depicted in FIGS. 7-11. With reference to FIG. 7, the bottom edge spacer assembly includes a panel spacer 70 and a sill spacer 80 positioned between the bottom edge 25 of door panel 20 and the sill 15 on the hinge side of the door panel 20. Although the bottom edge spacer assembly is depicted in position on the hinge side of the door panel, we understood that the components of the bottom edge spacer assembly may be used on the latch side of the door panel to provide proper spacing between the bottom edge 25 of door panel 20 and the sill 15 proximate both the hinge edge and the latch edge of the door panel.

Figure 8A:
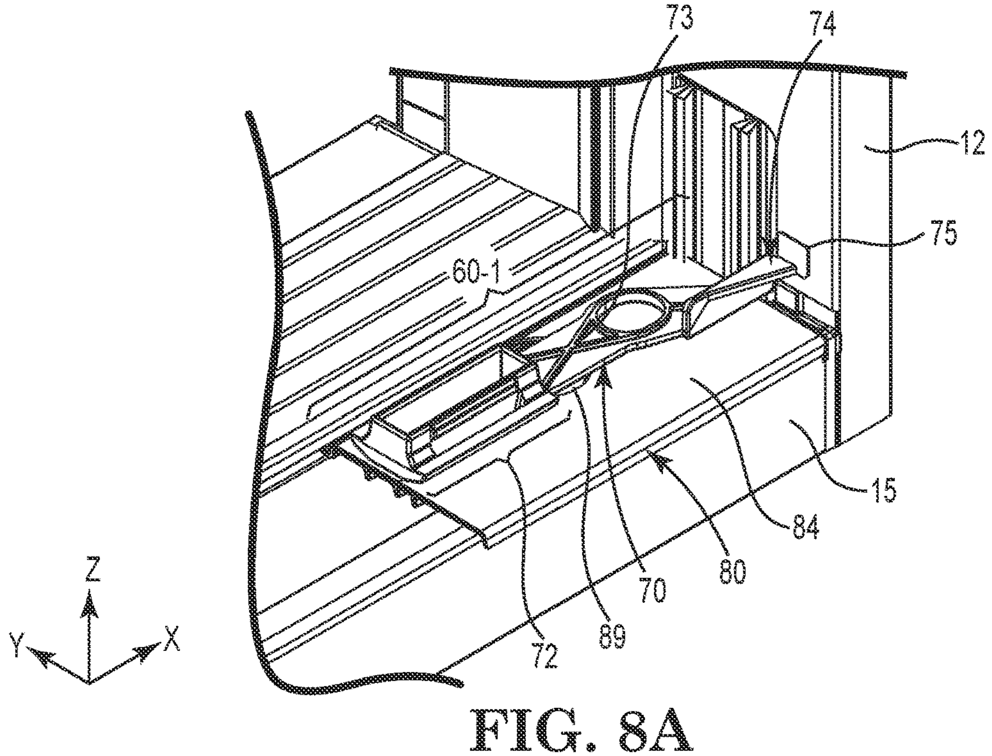
FIG. 8A is a view of the hinge side panel spacer and sill spacer of FIG. 7 with the door panel removed.
Figure 8B:
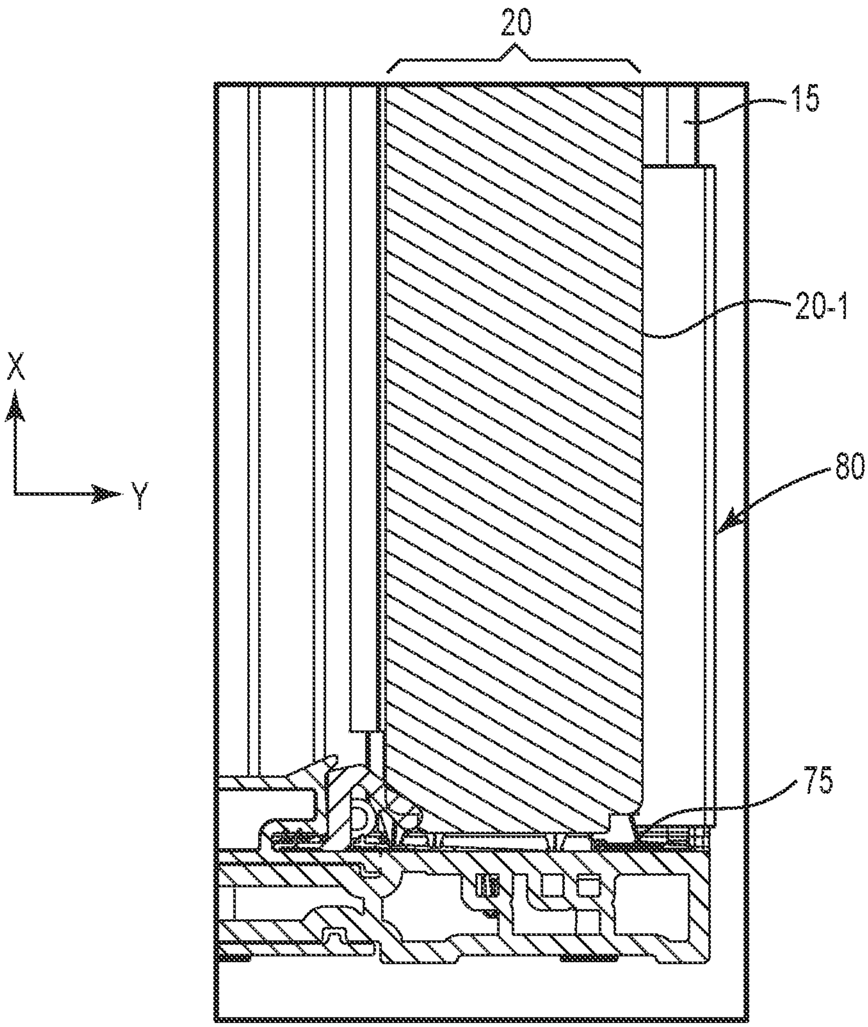
FIG. 8B is a cross-sectional view of the door panel 20 taken along line 8B-8B in FIG. 7.
Figure 9:
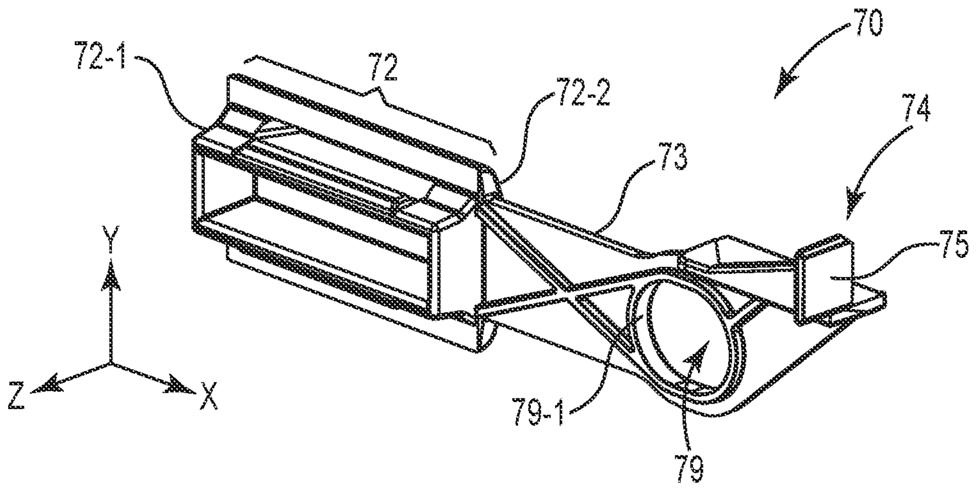
FIG. 9 is a perspective view of the panel spacer of FIGS. 7-8 in isolation.

FIG. 8A is an enlarged view of the bottom edge spacer assembly in position on the sill 15 after removal of the door panel 22 allow visualization of the components as positioned between the bottom edge 25 of door panel 20 and sill 15 and FIG. 8B is a cross-sectional view of the door panel 20 taken along line 8B-8B in FIG. 7 depicting portions of the hinge side panel spacer 70 and sill spacer 80. With reference to FIG. 9 in addition to FIG. 8, the panel spacer 70 includes a channel plug 72 and an optional corner guide 74. The channel plug 72 and the corner guide 74 are spaced apart from each other in the depicted illustrative embodiment by strut 73, with struts 73 providing a selected distance between corner guide 74 and channel plug 72.

In one or more embodiments, the corner guide 74 is preferably positioned proximate a corner formed by the hinge edge 22, bottom edge 25, and a face 20-1 of the door panel 20. In one or more embodiments, the face 20-1 of the door panel 20 proximate the corner guide 74 may preferably be the interior face of a prehung door system.

In the depicted illustrative embodiment, the corner guide 74 of panel spacer 70 includes an edge tab 75 that is, in one or more embodiments, used to position the panel spacer 70 in a selected location along the bottom edge 25 of the door panel 20 (i.e., along the X-axis). In one or more embodiments, it may be preferred that the edge tab 75 be positioned on (e.g., in contact with) the hinge side edge 22 of the door panel 20 and, as in the depicted embodiment, it may be preferred that the edge tab 75 be visible to a viewer looking at the face 20-1 (typically the interior face) of the door panel 20.

Figure 10:
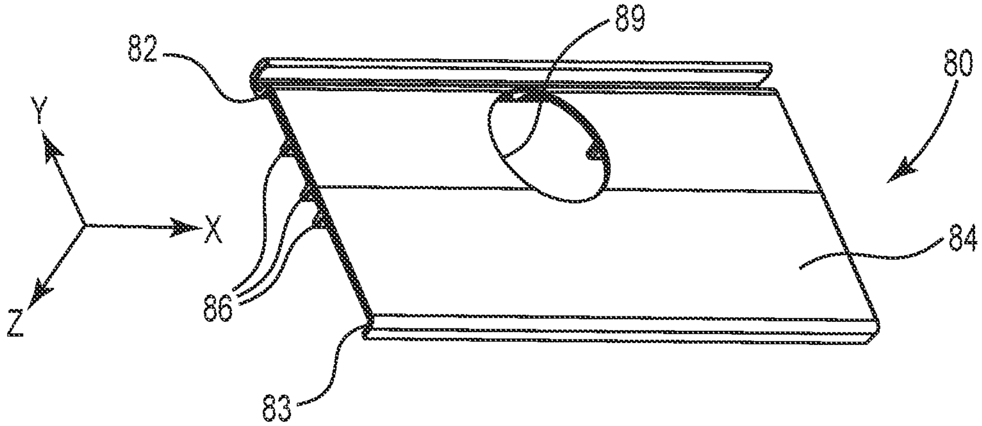
FIG. 10 is a perspective view of the sill spacer of FIGS. 7-8 in isolation.

With reference to FIG. 10, the depicted illustrative embodiment of sill spacer 80 includes a pair of retainers 82 and 83 on opposite sides of the plate 84 of the sill spacer 80. Intermediate supports 86 may be provided on one surface of the plate 84 to provide vertical structural integrity to the sill spacer in the area occupied by the channel plug 72 of the panel spacer 70 when the panel spacer 70 and sill spacer 80 are in position between the bottom edge of a door panel and the sill.

Figure 11:
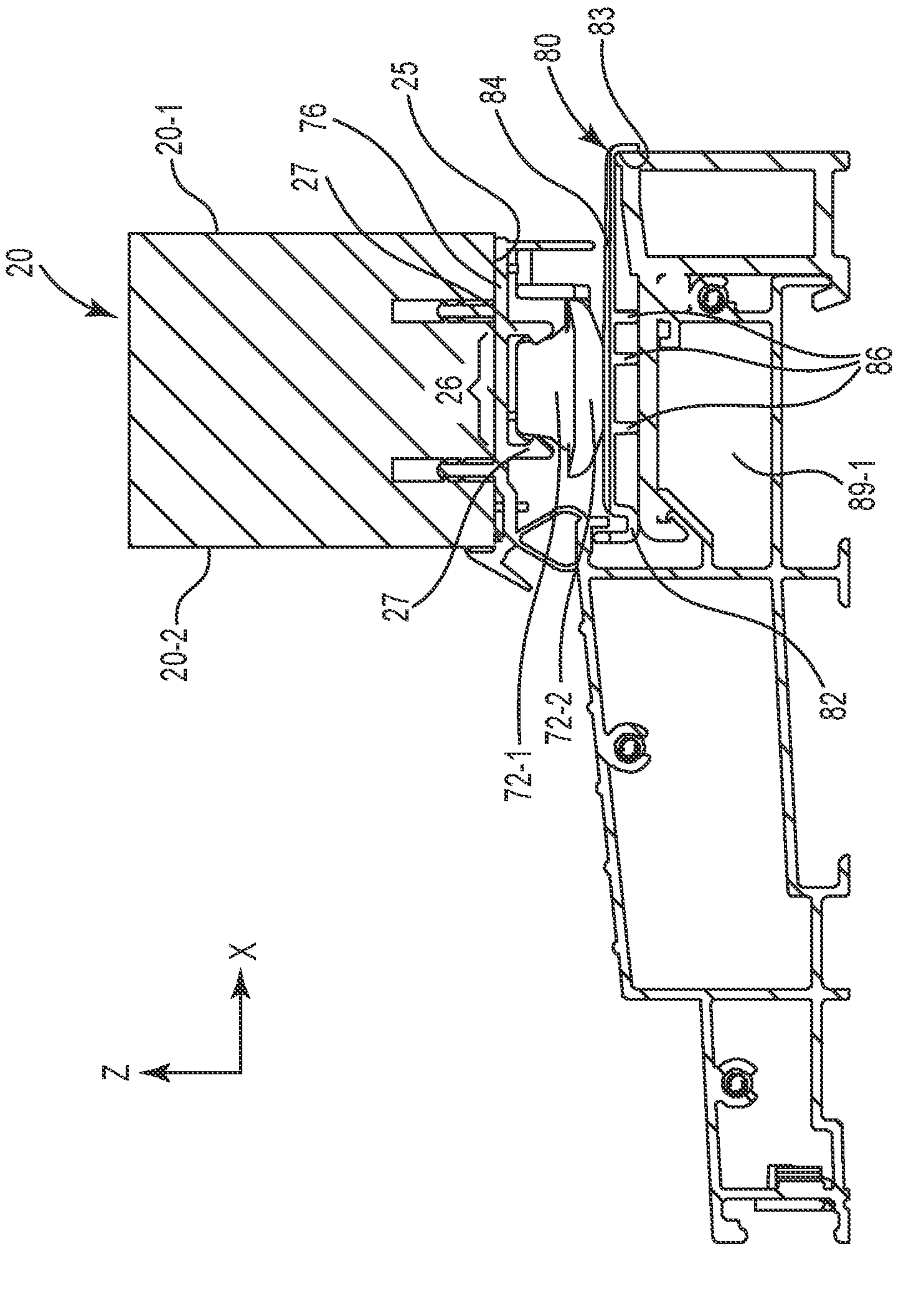
FIG. 11 is an enlarged cross-section view of the hinge side panel spacer and sill spacer of FIGS. 7-8 taken along line 11-11 in FIG. 1.

An enlarged cross-section view of the panel spacer 70 and sill spacer 80 of FIG. 7 is depicted in FIG. 11 with the view being taken along line 11-11 in FIG. 1. Features depicted in FIG. 11 that are not depicted in FIGS. 7-10 include a spacer channel 26 located on the bottom edge 25 of the door panel 20. Spacer channel 26 is formed between arms 27 that extend away from the bottom edge 25 of the door panel 20.

In one or more embodiments, the spacer channel 26 may extend along the entire length of the bottom edge 25 of the door panel 20 from the latch edge 24 to the hinge edge 22 although that is not required. What is required is that the spacer channel 26 be located in the position needed to retain channel plug 72 in position on the bottom edge 25 of the door panel 20. In one or more embodiments such as the depicted illustrative embodiment, the spacer channel 26 does extend along the entire length of the bottom edge 25 of the door panel 20 because arms 27 are incorporated into a carrier 76 used to provide weatherproofing structures along the bottom edge 25 of the door panel 20.

The depicted illustrative embodiment of channel plug 72 includes a head 72-1 configured to be received within the channel 26 between arms 27 and a foot 72-2 located outside of the channel 26. Foot 72-2 is, in the depicted illustrative embodiment, larger in surface area than the head 72-1 which may facilitate dispersion of loads between the door panel 20 and the sill 15.

Also depicted in the cross-sectional view of FIG. 11 is the sill spacer 80. Retainers 82 and 83 on opposite sides of the retainer 80 are configured to interlock with structures on the sill of the prehung door system to facilitate retention of the sill spacer 80 between the door panel 20 and sill 15. Also depicted in FIG. 11 are intermediate supports 86 on the surface of plate 84 to provide vertical structural integrity to the sill spacer 80 in the area occupied by the channel plug 72.

With reference to FIGS. 8A and 11, one or more embodiments of the sill spacers of bottom edge spacer assemblies as described herein include one or more apertures to provide clearance for features on the sill of the prehung door system. With reference to FIG. 8A in particular, sill spacer 80 may include an opening 89 plate 84 that provides clearance for a sill drain used to remove water from the sill 15. With reference to FIG. 11, the sill drain may in one or more embodiments, open into a drain chamber 89-1 in the sill 15 to channel water to an exterior side of the prehung door system after installation.

Still another optional feature that may be found in one or more embodiments of the bottom edge spacer assemblies described herein includes aperture 79 in panel spacer 70. When properly positioned on the bottom edge of a door panel, apertures 79 may provide passage for components installed in the door panel such as, e.g., foot bolts used to secure the door panel in place of the frame. Alternatively, the aperture 79 may include a rim 79-1 surrounding the perimeter of aperture 79 with the rim providing additional structural integrity to prevent damage to the sill from a component such as a foot bolt and/or foot bolt housing located in the bottom edge of the door panel.

The bottom edge spacer assembly depicted in FIGS. 7-11 is preferably configured to transfer at least a portion of the weight of the door panel 20 to the sill 15. To accomplish the weight transfer, the installed height of the bottom edge spacer assembly is selected to match the distance between the bottom edge 25 of the door panel 20 and the top of the sill 15 (with adjustments for components such as sweeps, etc. attached to the bottom edge of the door panel). In other words, the selected height of the bottom edge spacer assembly is selected to provide support to the door panel using the sill which, in one or more embodiments may mean that the selected height is essentially equal to the nominal spacing between the bottom edge of the door panel and the top of the sill.

Figure 12:
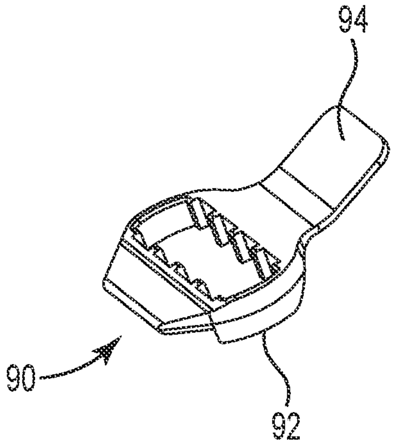
FIG. 12 is a perspective view of another illustrative embodiment of a panel spacer that may be used in one or more embodiments of door systems as described herein.
Figure 13:
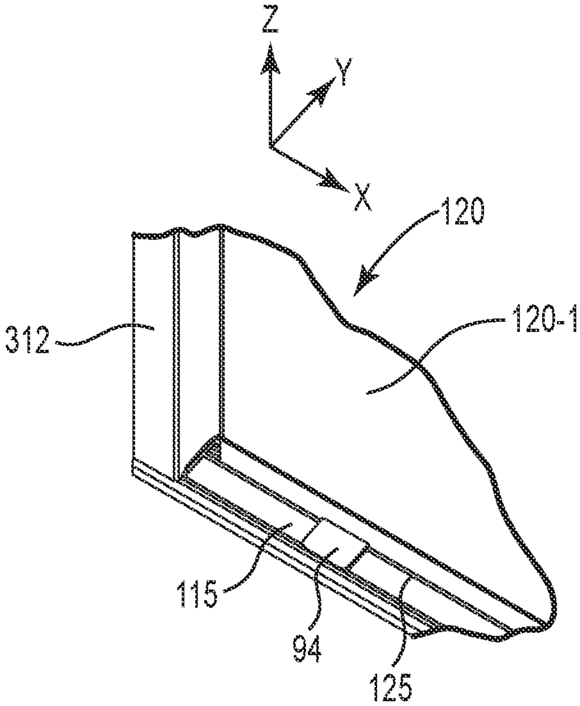
FIG. 13 is a perspective view of a door system with the panel spacer of FIG. 12 installed between the door panel and the sill.
Figure 14:
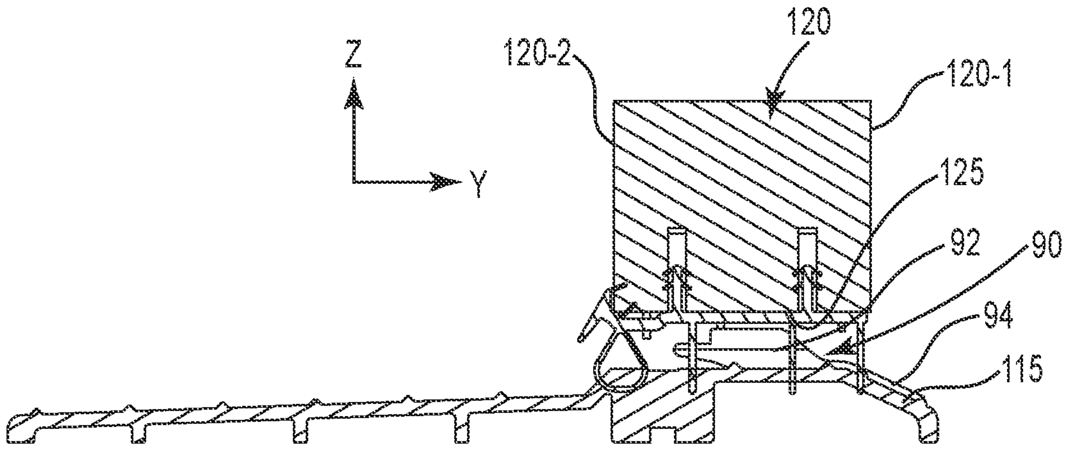
FIG. 14 is an enlarged cross-section view of the door system and panel spacer of FIG. 13 taken in a Y-Z plane passing through the panel spacer.

In terms of the embodiment of the bottom edge spacer assembly depicted in FIGS. 7-11, the height of the panel spacer 70 (in the area occupied by the channel plug 72) and the sill spacer 80 is equal to the distance between the bottom edge of the door panel (as modified by the installed sweep) and the top of the sill 15 (in the area facing the channel plug 72). Although all of these distances/thicknesses/components have manufacturing tolerances, the components are designed to provide the weight transfer discussed herein despite such variations. FIGS. 12-14 depict another embodiment of the bottom edge sill spacer that may be used in one or more embodiments of the packaged prehung door systems described herein. Unlike the previously described bottom edge spacer assemblies including components configured to be attached to the bottom edge of the door panel as well as the sill below the bottom edge of the door panel, the embodiment depicted in FIGS. 12-14 includes only a panel spacer 90 configured for attachment to the bottom edge 125 of door panel 120 (see, e.g., the cross-sectional view depicted in FIG. 14). In the depicted embodiment, the panel spacer 90 is attached to the bottom edge 125 of door panel 120 over a sweep that is also attached to the bottom edge 125 of the door panel 120.

The panel spacer 90 includes a foot 92 configured for positioning beneath the bottom edge 125 of door panel 120. In one or more embodiments, the foot 92 may be attached to the bottom edge 125 using any suitable technique or combination of techniques including, e.g., mechanical fasteners (e.g., brads, staples, tacks, screws, etc.), adhesives, etc. In addition to providing proper spacing between the bottom edge 125 of door panel 120 during, e.g., installation, the panel spacer 90 may also prevent unwanted compression of weatherstripping components positioned on the bottom edge 125 of the door panel 120.

The depicted illustrative embodiment of panel spacer 90 also includes a tab 94 configured to protrude from beneath the interface between the bottom edge 125 of the door panel 120 and the sill 115. Tab 94 may be used for convenient removal of the panel spacer 90 from beneath the door panel 120 after installation.

The bottom edge spacer assembly depicted in FIGS. 12-14 is also preferably configured to transfer at least a portion of the weight of the door panel 120 to the sill 115. To accomplish the weight transfer, the installed height of the bottom edge spacer assembly is selected to match the distance between the bottom edge 125 of the door panel 120 and the top of the sill 115 (with adjustments for components such as sweeps, etc. attached to the bottom edge of the door panel). In other words, the selected height of the bottom edge spacer assembly is selected to provide support to the door panel using the sill which, in one or more embodiments may mean that the selected height is essentially equal to the nominal spacing between the bottom edge of the door panel and the top of the sill. Although all of these distances/thicknesses/components have manufacturing tolerances, the components are designed to provide the weight transfer discussed herein despite such variations.

Figure 15:
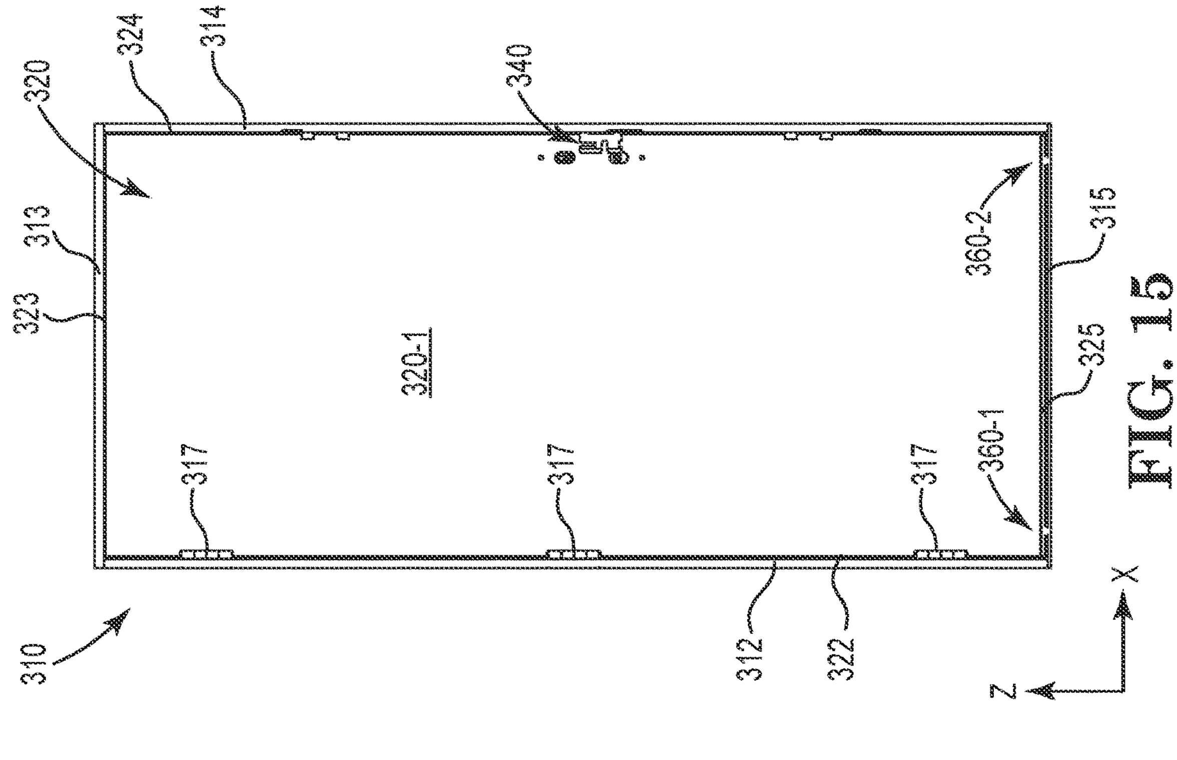
FIG. 15 depicts another alternative illustrative embodiment of a packaged prehung door system as described herein.

Another alternative illustrative embodiment of a packaged prehung door system 310 is depicted in FIGS. 15-18. FIG. 15 is an elevation view of the door system 310 which includes a frame having a hinge side jamb 312, a head jamb 313, a latch side jamb 314, and a sill 315.

Door panel 320 is located between hinge side jamb 312 and latch side jamb 314 and is connected to hinge side jamb 312 by hinges 317. The door panel 320 is configured to rotate about a hinge axis that is generally aligned with the hinge side jamb 312. The door panel 320 includes a hinge edge 322 facing the hinge side jamb 312 when the door panel 320 is in a closed configuration within the frame. Door panel 320 also includes a latch edge 324 facing the latch side jamb 314, a top edge 323 facing the head jamb 313, and a bottom edge 325 facing the sill 315.

The depicted illustrative embodiment of the packaged prehung door system depicted in FIG. 15 includes a latch edge retainer apparatus 340 configured to retain the latch edge or of the door panel 320 in alignment with the latch side jamb 314.

The depicted illustrative embodiment of the packaged prehung door system depicted in FIG. 15 also includes an optional hinge side bottom edge spacer 360-1 positioned proximate the hinge edge 322 of the door panel 320 as well as an optional latch side bottom edge spacer 360-2 position proximate the latch edge 324. The bottom edge spacers can assist in maintaining proper spacing between the bottom edge 325 and sill 315.

In one or more embodiments of the packaged prehung door systems described herein, the face 320-1 of door panel 320 is an interior face and none of the packaging system components extend past the hinge edge 322, latch edge 324, or bottom edge 325 to the exterior face of the door panel 320. Limiting the packaging system components to the interior face 320-1 and the edges of the door panel 320 can, in one or more embodiments, limit or prevent any deformation of weatherstripping installed on the door system at the junction between the exterior face of the door panel 320 and any stops attached to the jambs.

One or more embodiments of the packaged prehung door systems described herein include a deadbolt assembly installed in the interior volume of the door panel 320. In many cases, the deadbolt assembly is part of a multi-point latching system include upper and lower latches that extend from the latch edge 324 of the door panel 322 provide more secure attachment of the latch edge 324 of the door panel 320 to the latch side jamb 314 than would be provided only a single deadbolt and/or single latchbolt.

Figure 17:
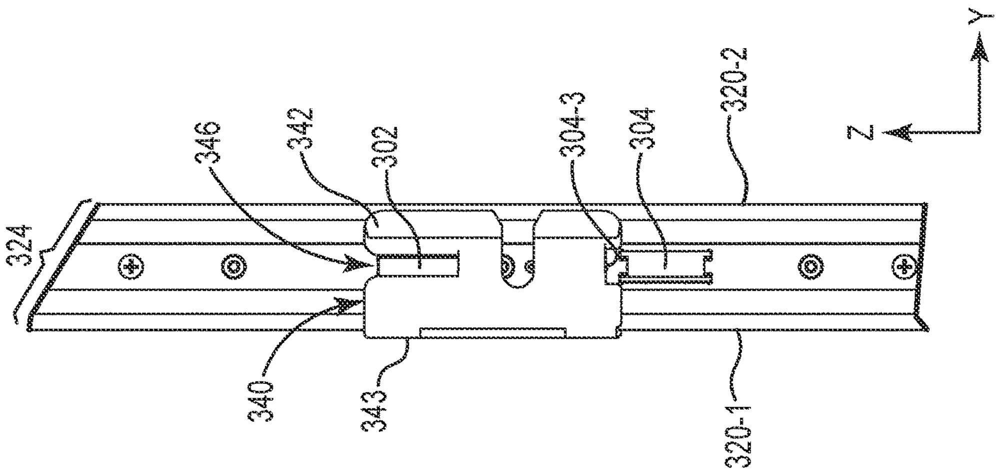
FIG. 17 is a view of the portion of the latch edge of the door panel of the packaged prehung door system depicted in FIG. 16 with the latch side jamb removed.
Figure 16:
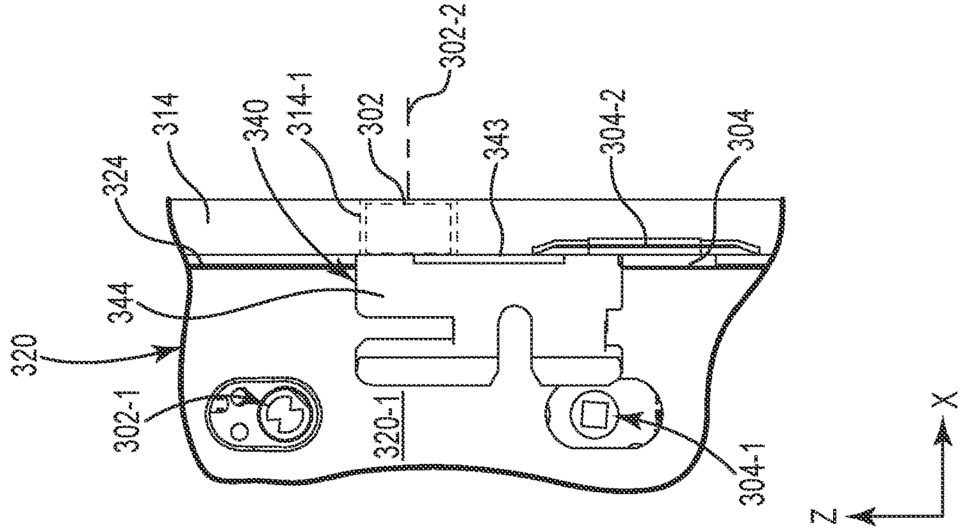
FIG. 16 is an enlarged view of a portion of the packaged prehung door system of FIG. 15 containing one illustrative embodiment of a latch edge retainer apparatus as described herein.
Figure 18:
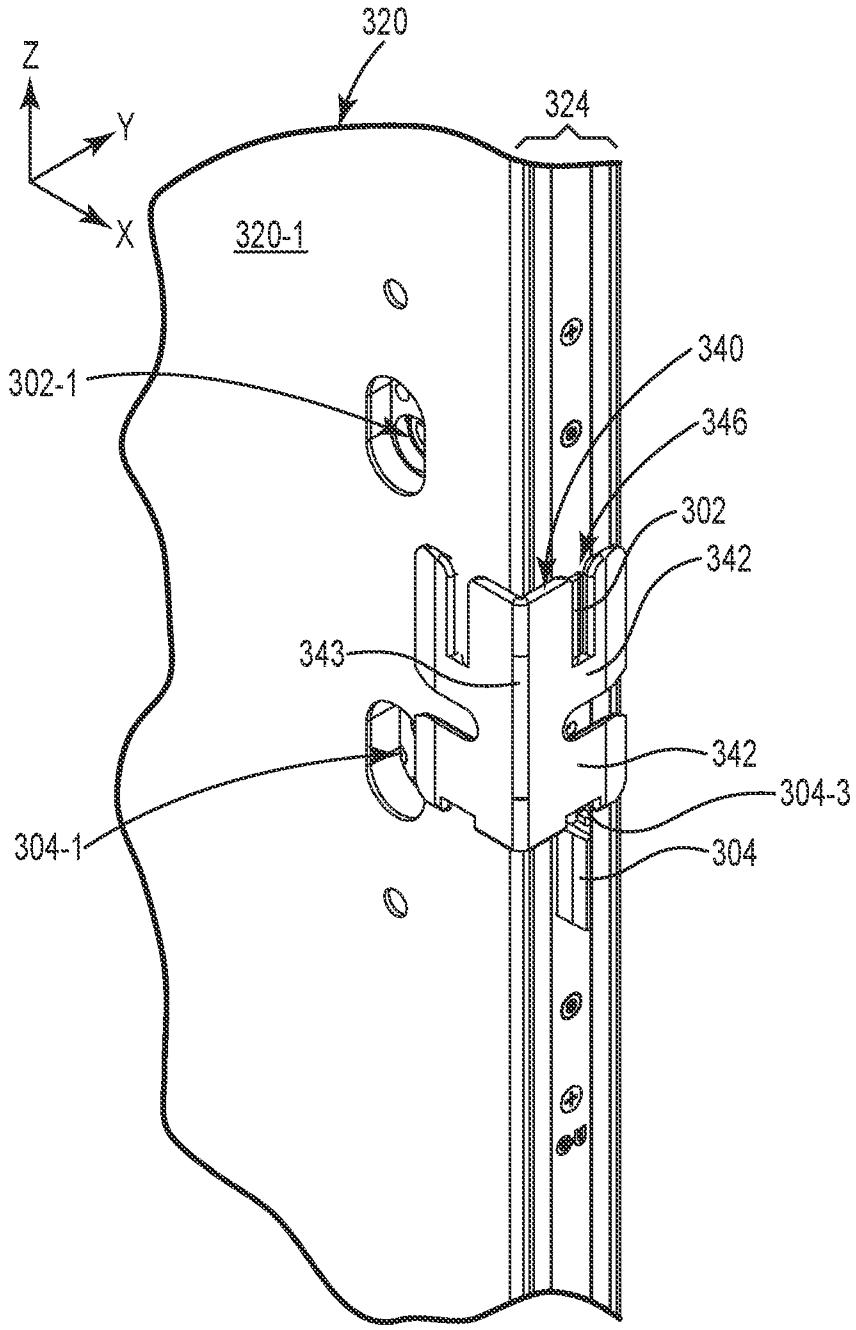
FIG. 18 is a perspective view of the portion of the latch edge of the door panel of the packaged prehung door system depicted in FIG. 16 with the latch side jamb removed.

FIG. 16 is an enlarged view of a portion of the packaged prehung door system of FIG. 15 containing the latch edge retainer apparatus 340 while FIG. 17 is a view of the portion of the latch edge 324 of the door panel 320 depicted in FIG. 16 with the latch side jamb 314 removed to expose the latch edge 324. FIG. 18 is a perspective view of the portion of the latch edge 324 of the door panel 320 with the latch side jamb 314 removed to expose the latch edge 324 of the door panel 320.

The deadbolt assembly installed in the door panel 320 includes a deadbolt 302 configured to extend from and retracted into the latch edge 324 of the door panel. The illustrative embodiment of the deadbolt assembly depicted in FIGS. 16-18 also includes a deadbolt actuator 302-1 located in the interior volume of the door panel. The interior volume of the door panel 320 is located between the pair of faces of the panel 320 (e.g., the interior and exterior faces). The deadbolt actuator 302-1 is configured to move the deadbolt 302 into and out of the interior volume of the door panel 320 when manipulated. Deadbolt actuator mechanisms are known and will not be further described herein, but typically, manipulation of the deadbolt actuator 302-1 involves rotation of a components within the deadbolt actuator about axis extending through the faces of the door panel 320.

As depicted in FIG. 16, the deadbolt 302 is extended from the latch edge 324 of the door panel 320 into a deadbolt cavity 314-1 in the latch side jamb 314. Deadbolt 302 and deadbolt cavity 314-1 are both depicted in broken lines because they would typically not be visible in the view of FIG. 16.

The latch edge retainer apparatus depicted in FIGS. 16-18 includes a panel clip 340 having a lock aperture 346. The panel clip 340 includes an edge plate 342 (seen in FIGS. 17-18) and a faceplate 344 (seen in FIGS. 16 and 18). The edge plate 342 and faceplate 344 attached to each other along a common edge 343. In the depicted embodiment, the edge plate 342 and faceplate 344 are oriented transverse to each other such that when the edge plate 342 is positioned on the latch edge 324 of the door panel 320 the common edge 343 is proximate a corner formed at the junction between the latch edge 324 and the face 320-1 of the door panel 320.

The depicted embodiment of lock aperture 346 of panel clip 340 is in the form of a slot opening along an axis extending along the latch edge 324 of the door panel 320 between the bottom edge 325 and the top edge 323 of the door panel 320. It should be understood that in one or more alternative embodiments, the lock aperture 346 may be in the form of a closed aperture, in other words, not a slot having an opening as depicted lock aperture 346 of panel clip 340. The slot form of lock aperture 346 may simplify installation of the panel clip 340 on a door panel and accommodate deadbolts 302 having different heights as measured along the length of the latch edge 324.

When the deadbolt 302 is extended from the latch edge 324 of the door panel 320, the deadbolt extends through the lock aperture 346 into deadbolt cavity 314-1 to assist in retaining the panel clip 340 and position on the door panel 320.

In the depicted embodiment, the panel clip 340 includes an edge plate 342 having a length sufficient to span nearly the entire the latch edge 324 between faces of the door panel 320. Full coverage of the latch edge 324 by the edge plate 342 may not be required. In one or more embodiments, it may be preferred that the edge plate 42 not extend past the face 320-2 of door panel 320 to, as discussed herein, avoid interference with weatherstripping, etc.

In one or more embodiments, the edge plate 342 may have a selected thickness measured along a bolt axis 302-2 oriented transverse to the hinge axis defined by hinges 317 to provide a desired spacing between the latch edge 324 of the door panel 320 and the latch side jamb 314.

The depicted illustrative embodiment of panel clip 340 also includes a latchbolt slot 304-3 configured to receive a portion of a latchbolt 304 of a latchbolt assembly installed in the door panel 320. The latch 304 of the latchbolt assembly is configured to extend from and retracted into the latch edge 324 of the panel 320 (the latchbolt 304 is depicted in its extended position in FIG. 18). Because the latchbolt typically includes an angled face configured to allow closing of the door with the latchbolt 304 extended, use of the latchbolt 304 as a mechanism to secure the panel clip 340 in position on the door panel 320 may not be optimal. Also depicted in FIG. 16 is a strike plate 304-2, the strike plate including an aperture configured to receive the latchbolt 304. Typically, the latch side jamb 314 also includes a latchbolt cavity configured to receive at least a portion of the latchbolt 304.

The illustrative embodiment of the latchbolt assembly depicted in FIGS. 16-18 also includes a latchbolt actuator 304-1 located in the interior volume of the door panel. The latchbolt actuator 304-1 is configured to move the latchbolt 304 into and out of the interior volume of the door panel 320 when manipulated. Latchbolt actuator mechanisms are known and will not be further described herein, but typically, manipulation of the latchbolt actuator 304-1 involves rotation of a components within the latchbolt actuator about axis extending through the faces of the door panel 320.

Figure 19:
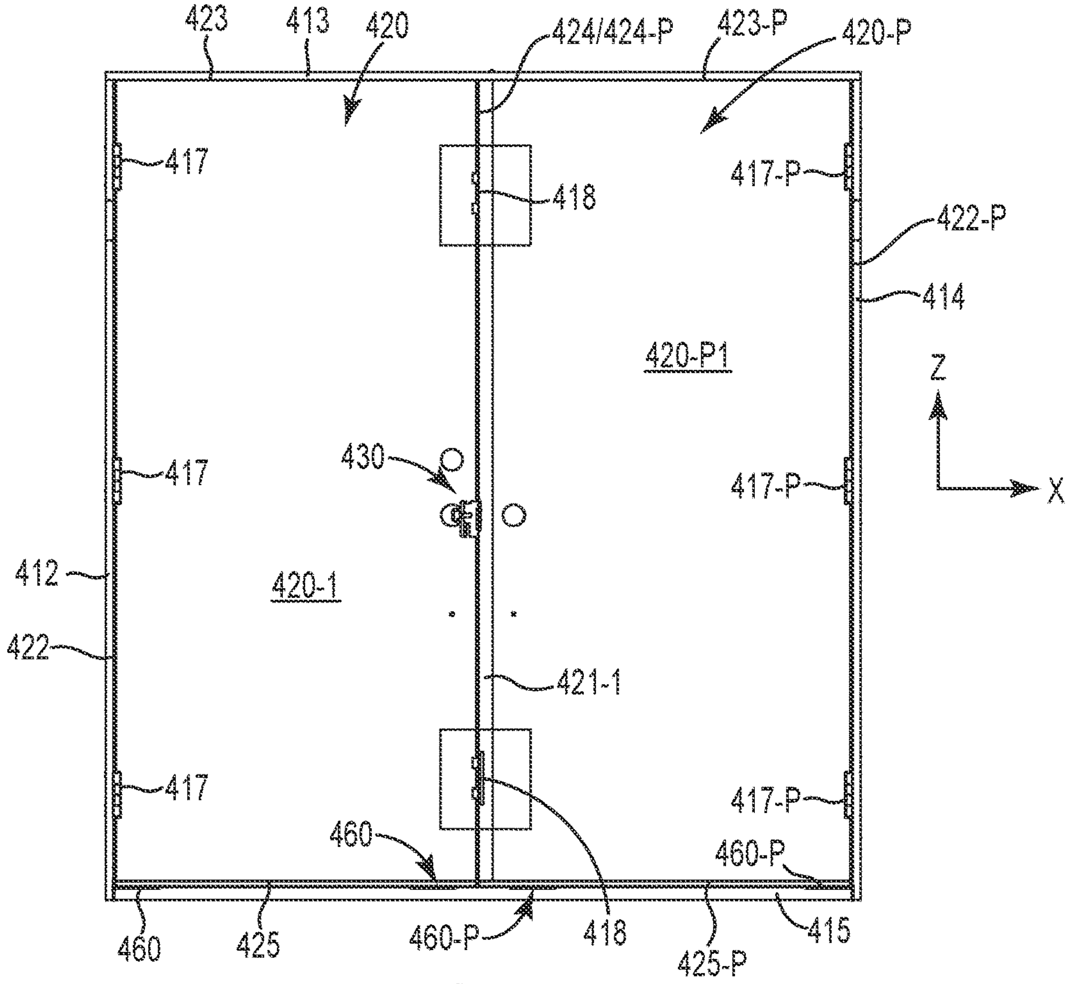
FIG. 19 depicts one illustrative embodiment of a packaged prehung door system as described herein and including hinged active and passive panels in a common frame and configured for use with a crossbore latchset.

FIG. 19 depicts another illustrative embodiment of a packaged prehung door system as described herein. The system depicted in FIG. 19 includes two door panels 420 and 420-P in a common frame. Panel 420 includes a face 420-1 while panel 420-P includes a face 420-P1. Panel 420 will be referred to herein as the active panel while panel 420-P will be referred to herein as the passive panel. In a two panel door system such as that depicted in FIG. 19, one panel, e.g., panel 420, is typically referred to as the active panel and is opened most often during use, while passive panel 420-P is most often stationary but can be opened as needed. It will be understood that the positions of the active and passive panels may be reversed in one or more alternative embodiments.

In one or more embodiments of the packaged prehung door system such as that depicted in FIG. 19, faces 420-1 of panel 420 and 420-P1 are interior faces and none of the packaging system components described herein extend past the hinge edges 422/422-P, top edges 423/423-P, latch edges 424/424-P, or bottom edges 425/425-P to the opposite faces of the panels 420/420-P. Limiting the packaging system components to the interior faces of the panels can, in one or more embodiments, limit or prevent any deformation of weatherstripping installed on the door system at the junction between the exterior faces of the panels and any stops or other features provided in the door systems for limiting rotation within the frame.

The frame includes a hinge side jamb 412, a head jamb 413, a latch side jamb 414, and a sill 415. Although the passive panel 420-P is hingedly attached to the latch side jamb 414, it is referred to herein as a "latch" side jamb because it faces the latch edge 424 of active panel 420 (even though the latch edge 424 is spaced apart from the latch side jamb 414 by the passive panel 420-P). In a two panel system as depicted in FIG. 19, passive panel 420-P may at least in some respects, be considered as a "jamb extension" of the side jamb 414 because it is in the position that would be occupied by a latch side jamb in a single panel door system.

Figure 20:
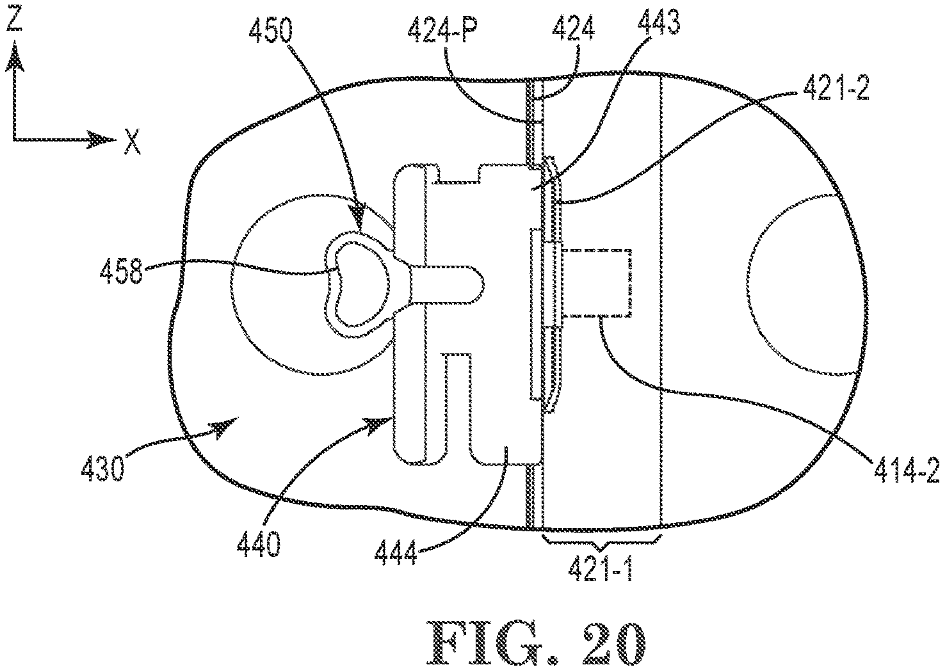
FIG. 20 is an enlarged view of the latch retainer apparatus provided in the junction of the active and passive panels (facing the panels).
Figure 23:
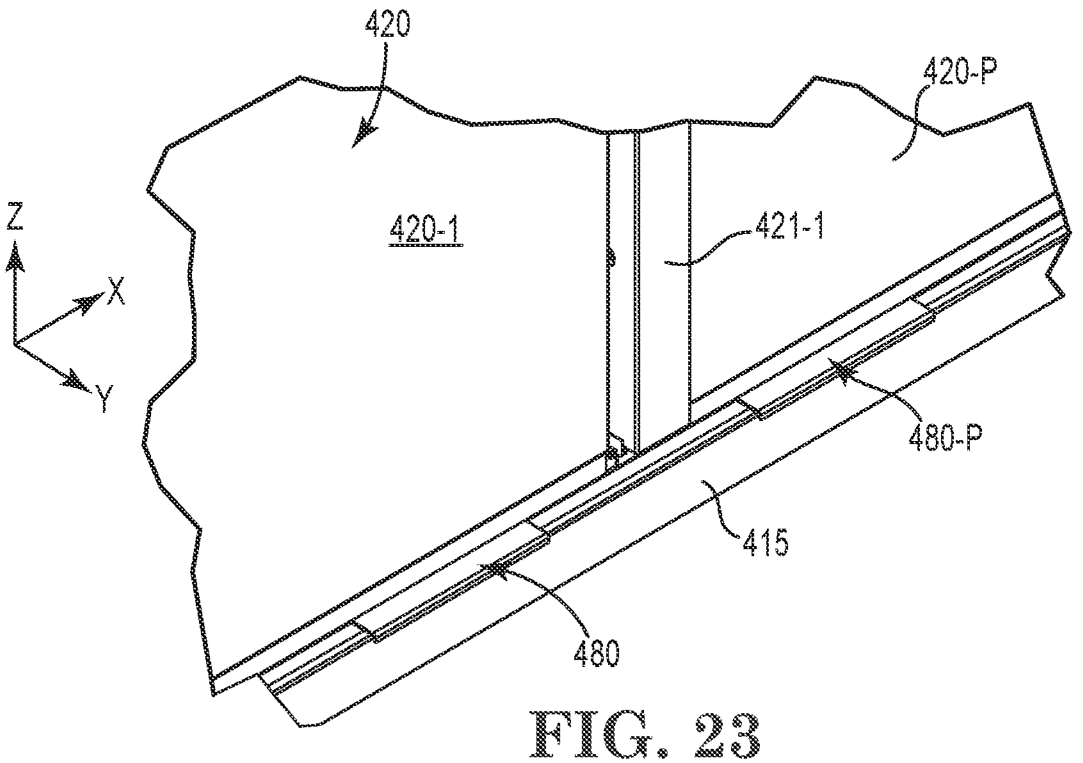
FIG. 23 is a perspective view of the junction between the active and passive panels at the sill for the packaged prehung door system of FIG. 19.

Also depicted in FIGS. 19-20 and 23 at the junction between the latch edges 424 and 424-P is trim piece 421-1 attached to and extending along the latch edge 424-P of passive panel 420-P. The trim piece 421-1 main one or more embodiments, serve as a stop for the active panel 420 as well as assisting in sealing the gap between the latch edges 424 and 424-P. Trim pieces such as trim piece 421-1 are sometimes referred to as astragals. To the extent that the trim piece 421-1 extends over the latch edge 424-P of passive panel 420-P, it may be considered to be a part of the latch edge 424-P of passive panel 420-P for purposes of the present invention.

Active panel 420 is located between the hinge side jamb 412 and passive panel 420-P and is connected to the hinge side jamb 412 by hinges 417. Panel 420 is configured to rotate about an axis defined by the hinges 417 that is generally aligned with the hinge side jamb 412. Panel 420 includes a hinge edge 422 facing the hinge side jamb 412 when the panel 420 is in a closed configuration within the frame. Panel 420 also includes a latch edge 424 facing the latch edge 424-P of panel 420-P when the panel 420 is in its closed configuration. Panel 420 also includes a top edge 423 facing the head jamb 413 and a bottom edge 425 facing the sill 415 when the panel 420 is in its closed configuration.

Passive panel 420-P is located between the latch side jamb 414 and active panel 420 and is connected to the side jamb 414 by hinges 417-P. Passive panel 420-P is configured to rotate about an axis defined by hinges 417-P that is generally aligned with the side jamb 414. Passive panel 420-P includes a hinge edge 422-P facing the side jamb 414 when the panel 420-P is in a closed configuration within the frame. Panel 420-P also includes a latch edge 424-P facing the latch edge 424 of active panel 420 when the passive panel 420-P is in its closed configuration. Panel 420-P also includes a top edge 423-P facing the head jamb 413 and a bottom edge 425-P facing the sill 415 when the panel 420-P is in its closed configuration.

The illustrative embodiment of the packaged prehung door system depicted in FIG. 19 also includes optional inter-panel spacers 418 positioned between the latch edge 424 of active panel 420 and latch edge 424-P of passive panel 420-P. These optional inter-panel spacers may be used to maintain proper spacing between the panels 420 and 420-P during transport and installation of the packaged prehung door system depicted in FIG. 19. As a result, inter-panel spacers 418 may form a part of the entire system for maintaining the packaged prehung door system in a square configuration through installation in a door opening.

Further, inter-panel spacers 418 may serve the function of, e.g., spacers 18 as depicted and described in connection with the packaged prehung door system 10 of FIG. 1. While those spacers 18 are positioned between the latch edge 24 of panel 20 and the latch side jamb 14, inter-panel spacers 418 are positioned, as described above, between the latch edge 424 of panel 420 and latch edge 424-P of panel 420-P. As a result, latch edge 424-P of panel 420-P essentially serves the same function as the latch side jamb 14 of door system 10. In other words and as discussed above, latch edge 424-P of panel 420-P may be considered to be an extension of the latch side jamb 414 in a two panel door system such as the illustrative embodiment depicted in FIG. 19.

One or more embodiments of a two panel packaged prehung door system such as that depicted in FIG. 19 may also include a latch edge retainer apparatus 430 between the latch edges 424/424-P of the panels 420/420-P and bottom edge spacer assemblies 460/460-P proximate both the hinge and latch edges of the panels 420/420-P to provide a packaged prehung door system that leverages this clearness of the panels 420/420-P2 square the frame containing the panels during both transport and installation of the packaged prehung door system in a building opening as described herein.

FIG. 20 is an enlarged view of the latch edge retainer apparatus 430 depicted in FIG. 19 that is similar, in many respects, to the latch edge retainer apparatus depicted and described in connection with FIGS. 2A-4. FIG. 20 is a view of the faces of the panels 420 and 420-P at the junction between latch edge 424 of panel 420 and latch edge 424-P of panel 420-P (along the Y axis). The active panel 420 includes a lock set bore formed through the panel 420 as well as a latch bore extending through the latch edge 424 of door panel 420 into the lock set bore as described herein in connection with the embodiment of FIGS. 2A-4.

The latch edge retainer apparatus depicted in FIG. 20 includes a panel clip 440 and a lock plug 450. Panel clip 440 includes an edge plate between the latch edges 424 and 424-P (similar to edge plate 42 of panel clip 40) and a faceplate 444 attached to the edge plate along common edge 443. The faceplate 444 is positioned on the face of the panel 420 and the common edge 443 is located proximate a corner formed at a junction between the latch edge 424 and face of the panel 420. The panel clip 440 also includes features found in panel clip 40 including a lock aperture similar to lock aperture 46 as well as an optional lock aperture in faceplate 444 to allow clip 440 to be used on both left and right hand swinging doors.

Lock plug 450 is also depicted in FIG. 20 in connection with the latch edge retainer apparatus 430 and is similar to lock plug 50 as depicted and described in connection with FIGS. 2A-4. The lock plug 50 includes a plug body extending along the plug axis, a bore portion, a latch portion as well as other features such as fins, locking channels, etc. Also depicted in FIG. 20 is a handle 458 of lock plug 450 that may be used for convenient manipulation of the lock plug 450 as described in connection with lock plug 50.

Also depicted in FIG. 20 is a latch cavity 414-2 provided in the latch edge 424-P of the passive panel 420-P. Latch cavity 414-2 serves the same function as latch cavity 14 found in latch side jamb 14 of the packaged prehung door system 10 as depicted in, e.g., FIG. 4. In other words, a latch portion of lock plug 450 protrudes from the latch edge 424 of the door panel 420 when the bore portion of the lock plug 450 is properly positioned in a latch bore in active panel 420 as described above in connection with packaged prehung door system 10. Extension of the latch portion of lock plug 450 into latch cavity 414-2 prevents rotation of the panel 420 (about, e.g., the hinge axis defined by hinges 417) due to interference between that latch portion of lock plug 450 and the latch cavity 414-2 in the latch edge 424-P of panel 420-P.

The depicted illustrative embodiment of the packaged pre-hung door system depicted in FIG. 19 also includes inter-panel spacers 418 that, as discussed herein, serve to maintain proper spacing between the panels 420 and 420-P during transport and installation of the packaged prehung door system depicted in FIG. 19.

Figure 21:
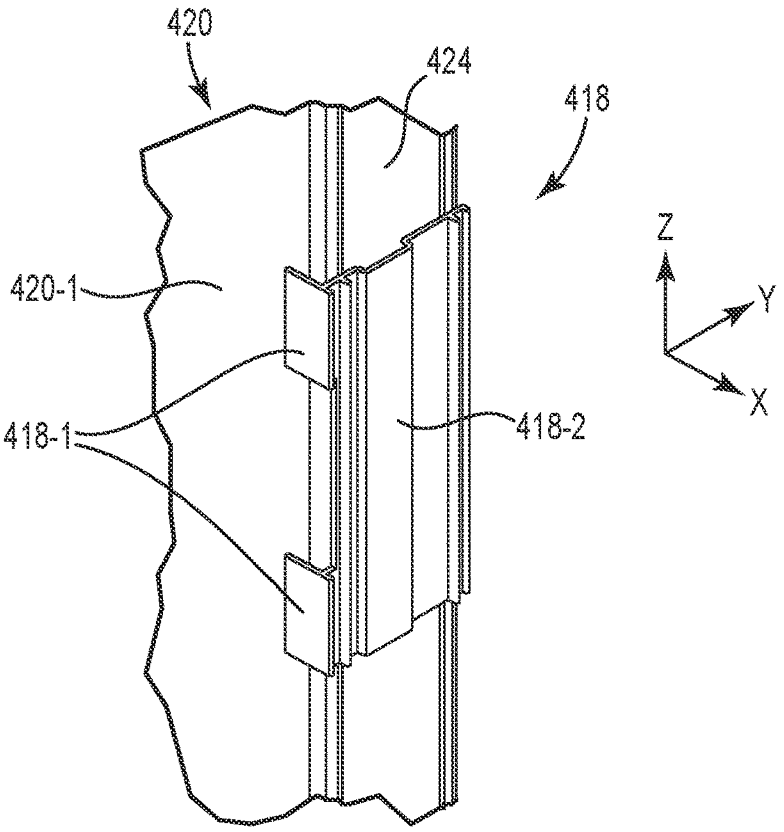
FIG. 21 is a perspective view of one illustrative embodiment of a spacer located between the panels in FIG. 19 viewed along the edge of the active panel with the passive panel removed.
Figure 22:
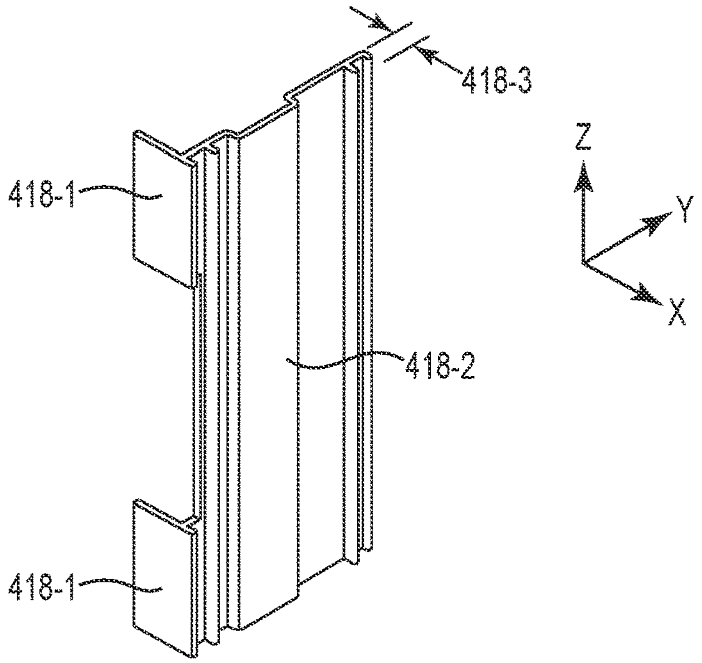
FIG. 22 depicts the spacer of FIG. 21 removed from the panel.

One illustrative embodiment of the inter-panel spacers 418 is depicted in isolation in FIGS. 21-22. The spacer 418 is depicted on the latch edge 424 of panel 420 in FIG. 21 and the spacer 418 is depicted in isolation in FIG. 22. The depicted illustrative embodiment of spacer 418 includes tabs 418-1 and a body portion 418-2. The tabs 418-1 rest on the face 420-1 of panel 420 and may assist in properly positioning the spacer 418 between the latch edges 124 and 424-P of panels 420 and 420-P. Although the depicted spacer 418 includes a pair of tabs 418-1, one or more alternative embodiments of inter-panel spacers may include only a single tab or 3 or more tabs. With reference to FIG. 22, the body portion 418-2 of spacer 418 may have a thickness 418-3 that would be measured between the latch edges 424 and 424-P (along the X-axis) that is selected to maintain the proper spacing between panels 420 and 420-P during transport and installation of the packaged prehung door system.

As depicted in FIG. 19, the depicted embodiment of the packaged prehung door system includes bottom edge spacer assemblies 460 and 460-P on both the hinge sides and latch sides of the panels 420 and 420-P. As discussed herein, providing bottom edge spacer assemblies in combination with the latch edge retainer apparatus described herein may provide a system that offers robust securement of the door panels within the frame for shipping and may also assist in retaining squareness of the frame during installation of the prehung door system in a building opening.

Figure 24:
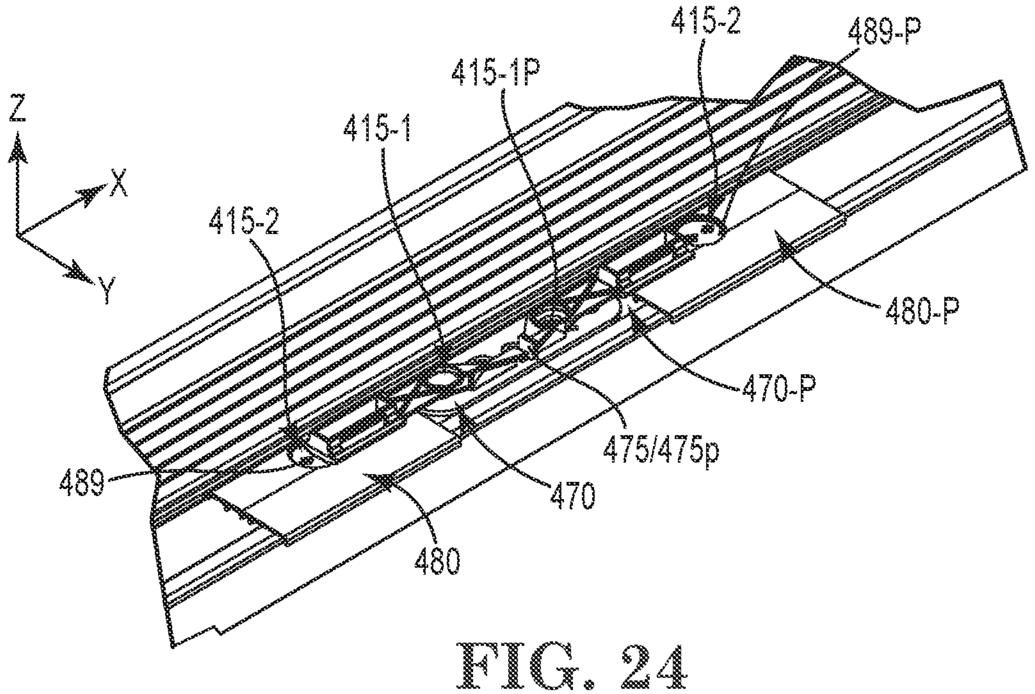
FIG. 24 is a view of the spacer assemblies found at the junction depicted in FIG. 23 with the active and passive panels removed to expose the spacer assemblies.

FIGS. 23-24 depict the illustrative embodiments of the spacer edge assemblies 460 and 460-P depicted in FIG. 19 between the bottom edges of door panels 420 and 420-P and sill 415 proximate the latch edges of the panels 420 and 420-P in more detail.

The illustrative embodiments of bottom edge spacer assemblies 460 and 460-P as depicted in FIGS. 23-24 include a panel spacer 470 positioned underneath panel 420 and a panel spacer 470-P positioned underneath panel 420-P as well as sill spacers 480 and 480-P positioned underneath the respective panel spacers. The panel spacers and sill spacers are positioned between the bottom edges 425 and 425-P of panels 420 and 420-P and the sill 415. Both sets of panel spacers and sill spacers depicted in FIGS. 23-24 preferably include the same features and construction found in panel spacer 70 and sill spacer 80 as described herein in connection with FIGS. 7-11.

Although the bottom edge spacer assemblies depicted in FIGS. 23-24 are located proximate the latch edges of their respective panels, it should be understood that components of similar bottom edge spacer assemblies can also be used proximate the hinge edges of both panel 420 and panel 420-P in one or more embodiments of the packaged prehung door systems described herein.

Panel spacer 470-P includes an aperture configured to allow the passage of a foot bolt from the bottom edge 425-P of panel 420-P into a foot bolt cavity 415-1P provided in sill 415. Panel spacer 470 also includes an aperture configured to allow the passage of a foot bolt from the bottom edge 425 of panel 420 into a foot bolt cavity 415-1 provided in sill 415. Although foot bolts are not typically included on active panels, panel spacer 470 includes an aperture because it is designed for door systems in which the positions of the active and passive panels are reversed. These apertures in both panel spacer 470 and 470-P are similar to apertures 89 described in connection with panel spacer 70.

Panel spacers 470 and 470-P also include a corner guides and channel plugs as described in connection with panel spacer 70 depicted and described in connection with FIGS. 7-11. Those corner guides may include edge tabs 475/475-P as well as other features configured to provide proper alignment of panel spacers 470 and 470-P on the bottom edges 425 and 425-P of panels 420 and 420-P as described above in connection with spacer 70.

Similarly, sill spacers 480 and 480-P may preferably include the features discussed herein with respect to sill spacer 80 as depicted in FIG. 7-11. Among the features of the sill spacers 480 and 480-P that are specifically called out in FIG. 24 include openings 489 and 489-P that provide clearance for sill drains 415-2 provided in sill 415.

Although details regarding only the bottom edge spacer assemblies located proximate the latch edges of panels 420 and 420-P are described above with reference to FIGS. 23-24, it should be understood that the bottom edge spacer assemblies found proximate the hinge edges of both panel 420 and 420-P may be similar in construction and function as the bottom edge spacer assemblies found proximate the latch edges of the panels 420 and 420-P.

As described elsewhere herein, the bottom edge spacer assemblies provided between the bottom edges 425 and 425-P of panels 420 and 420-P are preferably configured to transfer at least a portion of the weight of the panels 420 and 420-P to the sill 415. To accomplish the weight transfer, the installed height of the bottom edge spacer assemblies are selected to match the distance between the bottom edges of the panels and the top of the sill 415 (with adjustments for components such as sweeps, etc. otherwise attached to the bottom edges of the panels). In other words, the selected height of the bottom edge spacer assemblies is selected to provide support to the door panel using the sill which, in one or more embodiments, may mean that the selected height is essentially equal to the nominal spacing between the bottom edge of a panel and the top of the sill. Although all of these distances/thicknesses/components have manufacturing tolerances, the components are designed to generally provide the weight transfer discussed herein despite such variations.

Figure 25:
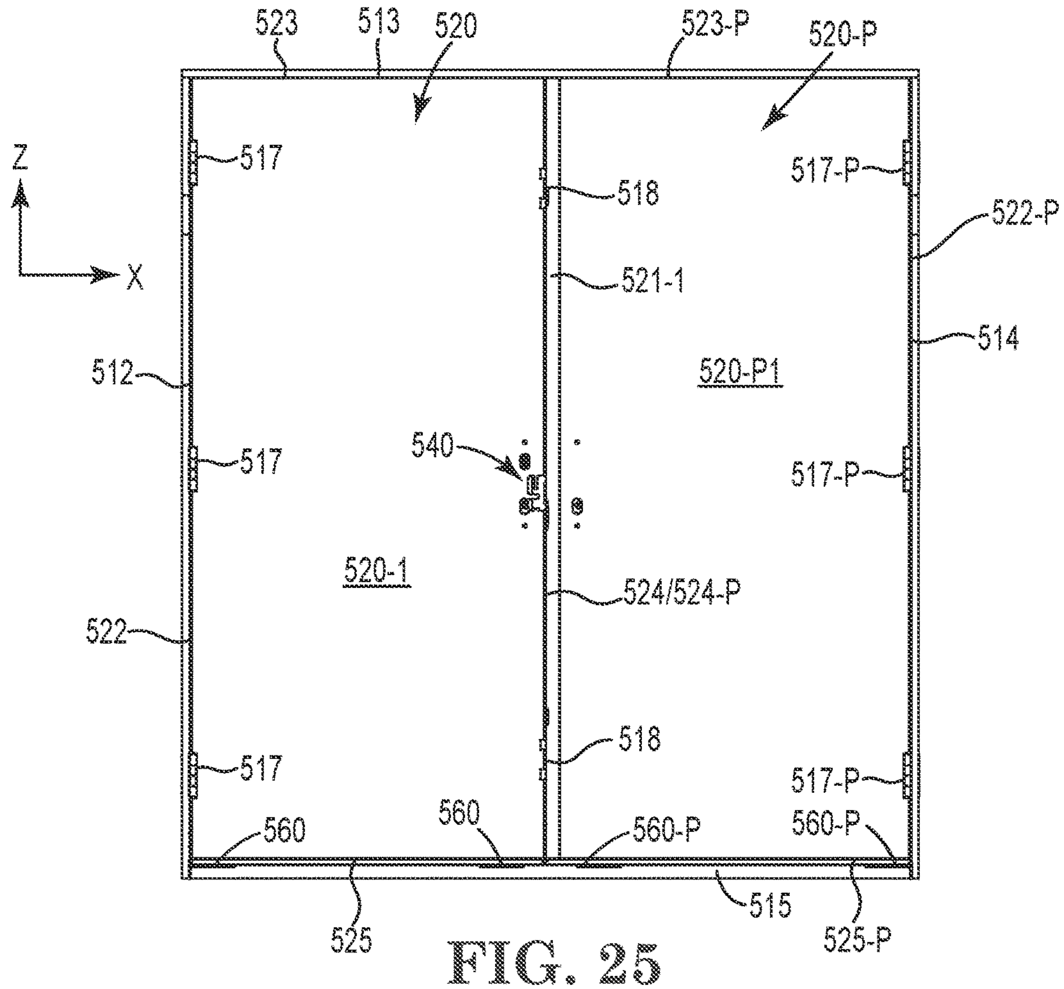
FIG. 25 depicts one illustrative embodiment of a packaged prehung door system as described herein and including hinged active and passive panels in a common frame, the panels incorporating a multi-point latching system.
Figure 26:
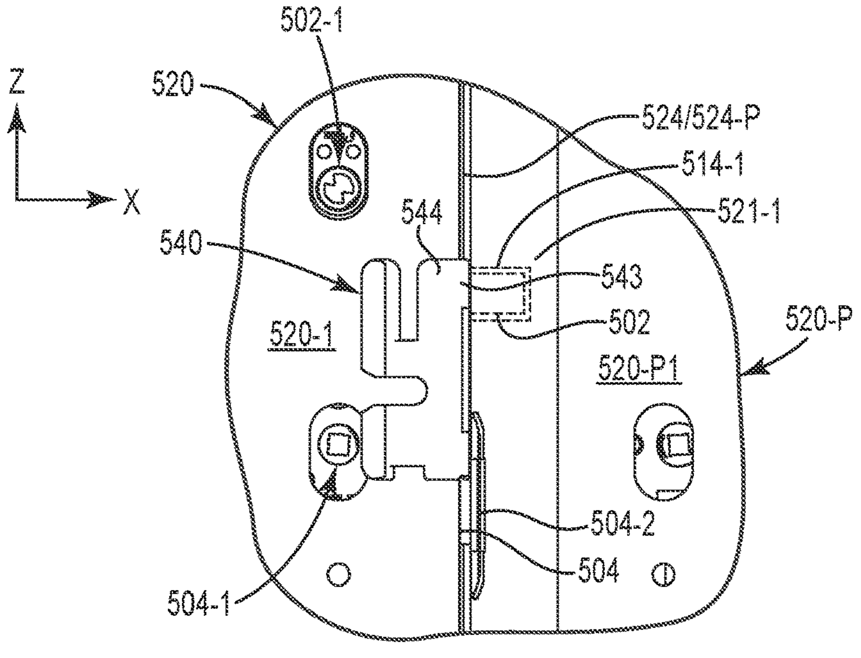
FIG. 26 is an enlarged view of the latch retainer apparatus provided in the junction of the active and passive panels (facing the panels).
Figure 27:
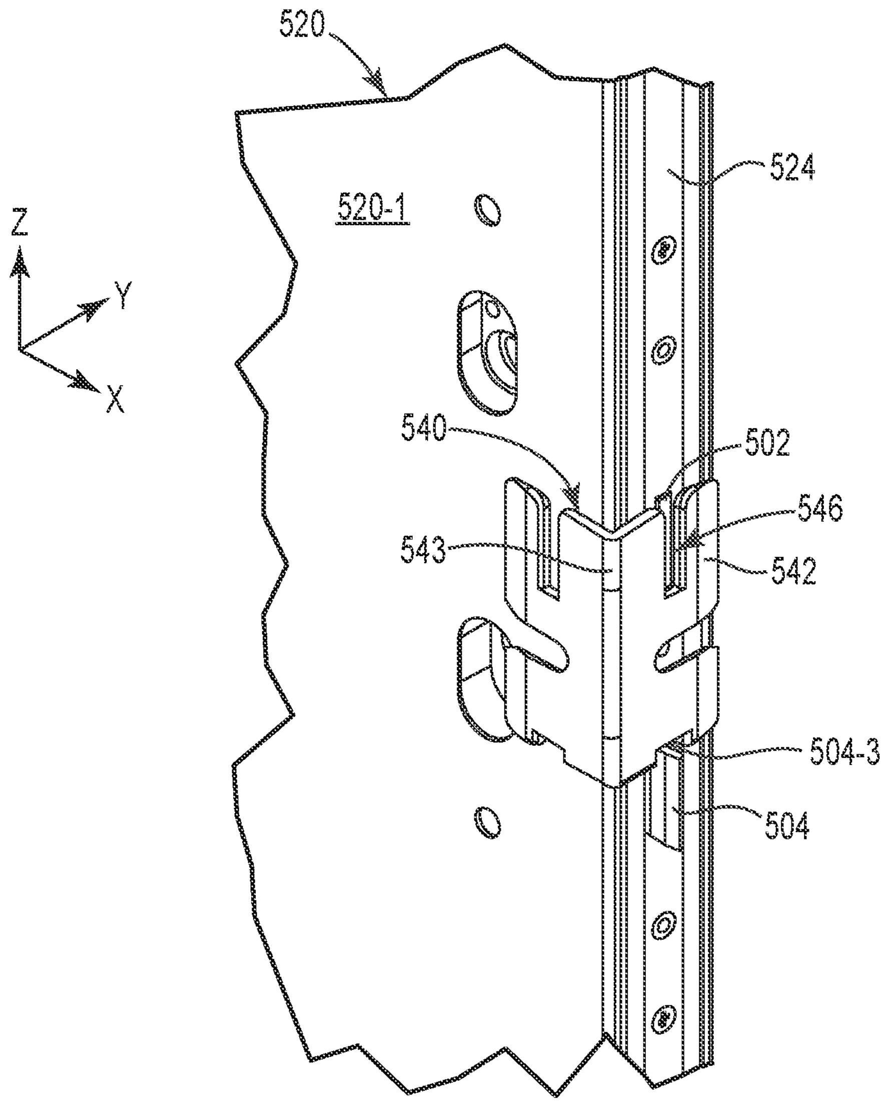
FIG. 27 is a perspective view of the latch retainer apparatus of FIG. 26 with the passive panel removed.

Another alternative illustrative embodiment of a packaged prehung door system is depicted in FIGS. 25-27. FIG. 25 is an elevation view of the door system including all of the features discussed above in connection with the packaged prehung door system depicted in FIG. 25. In particular, the system includes an active panel 520 and a passive panel 520-P. Both panels are contained within a frame that includes a hinge side jamb 512, a latch side jamb 514, head jamb 513, and sill 515.

Active panel 520 includes a hinge edge 522, a latch edge 524, a top edge 523, and a bottom edge 525. The hinge edge 522 is attached to hinge side jamb 512 using hinges 517. Passive panel 520-P includes a hinge edge 522-P, a latch edge 524-P (facing latch edge 524 of active panel 520), a top edge 523-P, and a bottom edge 525-P. The hinge edge 522-P is attached to the latch side jamb 514 using hinges 517-P. As discussed above with respect to the door system depicted in FIG. 19, latch side jamb 514 is referred to herein as a “latch” side jamb because it faces the latch edge 524 of active panel 520 (even though the latch edge 524 is spaced apart from the latch side jamb 514 by the passive panel 520-P). In a two panel system as depicted in FIG. 25, passive panel 520-P may at least in some respects, be considered as a “jamb extension” of the side jamb 514 because it is in the position that would be occupied by a latch side jamb in a single panel door system.

Also included in the packaged prehung door system depicted in FIG. 25 are inter-panel spacers 518 and a trim piece/astragal 521-1 on passive panel 520-P, along with bottom edge spacer assemblies 560 and 560-P positioned between the bottom edges 525 and 525-P of panels 520 and 520-P.

The illustrative embodiment of the packaged prehung door system depicted in FIGS. 25-27 includes a latch edge retainer apparatus 540 configured to retain the latch edge 524 of active panel 520 in alignment with the latch edge 524-P of passive panel 520-P. The latch edge retainer apparatus 540 depicted in FIGS. 25-27 preferably includes the features depicted and described in connection with panel clip 340 in FIGS. 15-18 regardless of whether those features are depicted and/or described in connection with panel clip 540 in FIGS. 25-27.

As discussed in connection with other embodiments of the packaged prehung door systems described herein, the latch edge retainer apparatus 540, inter-panel spacers 518, and bottom edge spacer assemblies 560/560-P described in connection with the packaged prehung door system depicted in FIGS. 25-27 may together, provide for a packaged prehung door system that maintains its squareness during both shipping and installation with the components being removed only after proper placement of the sill 515 along with attachment of the side jambs 512 and 514 within a building opening. Squareness can be maintained using these components by leveraging the squareness of the panels 520 and 520-P of the packaged prehung door system.

The illustrative embodiment of the prehung door system depicted in FIGS. 25-27 includes a deadbolt assembly installed in the interior volume of panel 520. In many cases, the deadbolt assembly may be part of a multipoint latching system including upper and lower latches that extend from the latch edge 524 of the panel 520 to provide more secure attachment of the latch edge 524 of panel 522 the latch edge 524-P of the panel 520-P than would be provided with only a single deadbolt and/or single latch bolt.

FIG. 26 is an enlarged view of a portion of the packaged prehung door system of FIG. 25 containing the latch edge retainer apparatus 540 while FIG. 27 is a perspective view of the portion of the latch edge 524 of door panel 520 depicted in FIG. 16 with the passive panel 520-P removed to expose the latch edge 524.

The deadbolt assembly installed in panel 520 includes a deadbolt 502 configured to extend from and retract into the latch edge 524 of panel 520. The deadbolt assembly also includes a deadbolt actuator 502-1 located in the interior volume of the panel 520 (the interior volume of panel 520 being located between the faces of the panel 520, e.g., the interior and exterior faces). The deadbolt actuator 502-1 is configured to move the deadbolt 502 into and out of the interior volume of the panel 520 when manipulated. Deadbolt actuator mechanisms are known and will not be further described herein, but typically, manipulation of the deadbolt actuator 502-1 involves rotation of components within the deadbolt actuator about an axis extending through the faces of the panel 520.

As depicted in FIG. 26, the deadbolt 502 is extended into a deadbolt cavity 514-1 provided in the latch edge 524-P of panel 520-P. Deadbolt 502 and deadbolt cavity 514-1 are both depicted in broken lines because they would typically not be visible in the view of FIG. 26.

The latch edge retainer apparatus depicted in FIGS. 25-27 also includes a panel clip 540 having a faceplate 544 and an edge plate 542 that meet each other along a common edge 543. In the depicted embodiment, the edge plate 542 and faceplate 544 are oriented transverse to each other such that when the edge plate 542 is positioned on the latch edge 524 of panel 520, the common edge 543 is proximate a corner formed at the junction between the latch edge 524 and face 520-1 of panel 520. The edge plate 542 of panel clip 540 preferably has a thickness measured along an axis extending between the latch edges 524 and 524-P of panels 520 and 520-P that provides or maintains a desired spacing between the latch edges 524/524-P during shipping and installation of the packaged prehung door system.

Panel clip 540 also includes a lock aperture 546 in the form of a slot in edge plate 542 opening along an axis extending along the latch edge 524 of panel 520 between the bottom edge 525 and top edge 523 of panel 520. Although depicted as a slot, it should be understood that in one or more alternative embodiments the aperture 546 may be in the form of a closed aperture.

When deadbolt 502 is extended from the latch edge 524 of the panel 520 the deadbolt extends through the aperture 546 into the deadbolt cavity 514-1 to assist in retaining the panel clip 540 in position on panel 520.

With reference to FIG. 27, the depicted embodiment of panel clip 540 includes a latch bolt slot 504-3 configured to receive a portion of a latch bolt 504 of a latch bolt assembly installed in panel 520. The latch 504 of the latch bolt assembly is configured to extend from and retract into the latch edge 524 of panel 520 with the latch bolt 504 depicted in its extended position in FIG. 27. Because the latch bolt 504 typically includes an angled face configured to allow closing of the door with the latch bolt 504 extended, use of the latch bolt 504 as a mechanism to secure the panel clip 540 in position on the panel 520 may not be optimal. Also depicted in FIG. 26 is a strike plate 504-2 that preferably includes an aperture configured to receive at least a portion of the latch bolt 504. Also depicted in FIG. 26 is a latch bolt actuator 504-1 located in the interior volume of panel 520. The latch bolt actuator 504-1 is configured to move the latch bolt 504 into and out of the interior volume of the panel 520 when manipulated. Latch bolt actuator mechanisms are known and will not be further described herein, but typically, manipulation of the latch bolt actuator 504-1 involves rotation of components within the latch bolt actuator about an axis extending through the faces of the panel 520.

The various components used in the packaged prehung door systems described herein may be constructed of any suitable material or combination of materials including polymers, metals, composites, wood, ceramics, etc. The particular materials used need only perform the functions of the various components as described herein and suitable choices for the materials will be known to those of skill in the art.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of door systems including one or more embodiments of the packaged prehung door systems, components thereof, and related methods are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A packaged prehung door system comprising:

a door system frame comprising a hinge side jamb, a latch side jamb, and a sill extending between a sill end of the hinge side jamb and a sill end of the latch side jamb;

a panel comprising a hinge edge attached to the hinge side jamb and a latch edge facing the latch side jamb, the panel comprising a pair of faces spaced apart from each other and extending from the hinge edge to the latch edge, the panel configured to rotate relative to the hinge side jamb about a hinge axis aligned with the hinge side jamb;

a lockset bore extending through the panel along a lockset bore axis oriented transverse to the hinge axis;

a latch bore extending through the panel along a latch axis extending from the lockset bore through the latch edge along a latch axis, wherein the latch axis is transverse to the hinge axis and the lockset bore axis; and a latch edge retainer apparatus configured to retain the latch edge of the panel in alignment with the latch side jamb, the latch edge retainer apparatus comprising:

a panel clip comprising an edge plate and a face plate attached to each other along a common edge, wherein the edge plate and the face plate are oriented transverse to each other such that when the edge plate is positioned on the latch edge of the panel, the face plate is positioned on a face of the panel and the common edge is proximate a corner formed at a junction between the latch edge and the face of the panel, a lock aperture located in the edge plate, the lock aperture defined by a pair of aperture edges, and a lock plug comprising a plug body extending along a plug axis, wherein:

the plug body comprises a bore portion and a latch portion aligned along the plug axis, the lock plug comprises a locking channel at a junction between the bore portion and the latch portion, at least one of the aperture edges of the lock aperture is located in the locking channel when the edge plate of the panel clip is located between the latch edge of the panel, and the latch side jamb and the bore portion of the lock plug is positioned in the latch bore such that the latch portion protrudes from the latch edge of the panel;

wherein, when the edge plate of the panel clip is located between the latch edge of the panel and the latch side jamb such that the lock aperture is aligned with the latch bore, the face plate is located on a selected face of the panel;

and wherein, when the bore portion of the lock plug is positioned in the latch bore such that the latch portion protrudes from the latch edge of the panel, the latch portion of the lock plug extends into a latch cavity such that rotation of the panel is prevented by interference between the latch portion of the lock plug and the latch cavity.

2. A system according to claim 1, wherein the latch cavity is located in the latch side jamb.

3. A system according to claim 1, wherein the panel comprises an active panel and wherein the packaged prehung door system comprises a passive panel located between the latch edge of the active panel and the latch side jamb, wherein the passive panel comprises a passive panel latch edge facing the latch edge of the active panel and a passive panel hinge edge facing the latch side jamb, the passive panel attached to the latch side jamb and configured to rotate relative to the latch side jamb about a latch side jamb axis aligned with the latch side jamb;

wherein the latch cavity is located in the passive panel latch edge, and wherein the latch edge retainer apparatus is configured to retain the latch edge of the active panel in alignment with the passive panel latch edge.

4. A system according to claim 3, wherein the edge plate comprises a selected edge plate thickness measured along the latch bore, wherein the selected edge plate thickness comprises a desired spacing between the latch edge of the active panel and the passive panel latch edge.

5. A system according to claim 1, wherein the lock plug is in a locked configuration when the aperture edge is located in the locking channel, and wherein the lock plug is configured to move from the locked configuration to an unlocked configuration in which the aperture edge is not located in the locking channel, wherein the lock plug rotates in the latch bore about the plug axis when moving between the locked configuration and the unlocked configuration.

6. A system according to claim 1, wherein the lock aperture in the edge plate comprises a slot that comprises an opening along a free edge of the edge plate, wherein the pair of aperture edges of the lock aperture extend from the free edge towards the common edge of the panel clip.

7. A system according to claim 1, wherein the bore portion comprises a maximum cross-plug bore dimension measured transverse to the plug axis and the latch portion comprises a maximum cross-plug latch dimension measured transverse to the plug axis, wherein the maximum cross-plug bore dimension is greater than the maximum cross-plug latch dimension.

8. A system according to claim 1, wherein the bore portion comprises a maximum cross-plug bore dimension measured transverse to the plug axis and wherein the latch bore comprises a latch bore diameter measured transverse to the latch axis, wherein the maximum cross-plug bore dimension is greater than or equal to the latch bore diameter.

9. A system according to claim 1, wherein the edge plate comprises a selected edge plate thickness measured along the latch bore, wherein the selected edge plate thickness comprises a desired spacing between the latch edge of the panel and the latch side jamb.

10. A system according to claim 1, wherein the panel comprises a bottom edge extending between the latch edge and the hinge edge, the bottom edge also extending between the pair of faces of the panel, and wherein the bottom edge of the panel comprises a spacer channel extending along a length of the bottom edge from the latch edge to the hinge edge, and wherein the system further comprises:

a latch side panel spacer comprising a latch side channel plug retained in the spacer channel and a latch side corner guide positioned proximate a corner formed by the hinge edge, bottom edge, and one face of the panel; and a latch side sill spacer retained on the sill between the latch side channel plug and the sill.

11. A system according to claim 10, wherein the latch side corner guide comprises an edge tab spaced at a selected distance from the latch side channel plug such that when the edge tab of the latch side panel spacer is placed against the latch edge, the latch side channel plug is in a selected position in the spacer channel on the bottom edge of the panel.

12. A packaged prehung door system comprising:

a door system frame comprising a hinge side jamb, a latch side jamb, and a sill extending between a sill end of the hinge side jamb and a sill end of the latch side jamb;

a panel comprising a hinge edge attached to the hinge side jamb, a latch edge facing the latch side jamb, a pair of faces spaced apart from each other and extending from the hinge edge to the latch edge, a bottom edge extending between the latch edge and the hinge edge, the bottom edge also extending between the pair of faces of the panel, and wherein the bottom edge of the panel comprises a spacer channel extending along a length of the bottom edge from the latch edge to the hinge edge, the panel configured to rotate relative to the hinge side jamb about a hinge axis aligned with the hinge side jamb;

a lockset bore extending through the panel along a lockset bore axis oriented transverse to the hinge axis;

a latch bore extending through the panel along a latch axis extending from the lockset bore through the latch edge along a latch axis, wherein the latch axis is transverse to the hinge axis and the lockset bore axis; and a latch edge retainer apparatus configured to retain the latch edge of the panel in alignment with the latch side jamb, the latch edge retainer apparatus comprising:

a panel clip comprising an edge plate and a face plate attached to each other along a common edge, wherein the edge plate and the face plate are oriented transverse to each other such that when the edge plate is positioned on the latch edge of the panel, the face plate is positioned on a face of the panel and the common edge is proximate a corner formed at a junction between the latch edge and the face of the panel, a lock aperture located in the edge plate, the lock aperture defined by a pair of aperture edges, and a lock plug comprising a plug body extending along a plug axis, wherein the plug body comprises a bore portion and a latch portion aligned along the plug axis;

wherein, when the edge plate of the panel clip is located between the latch edge of the panel and the latch side jamb such that the lock aperture is aligned with the latch bore, the face plate is located on a selected face of the panel;

and wherein, when the bore portion of the lock plug is positioned in the latch bore such that the latch portion protrudes from the latch edge of the panel, the latch portion of the lock plug extends into a latch cavity such that rotation of the panel is prevented by interference between the latch portion of the lock plug and the latch cavity, and wherein the system further comprises:

a hinge side panel spacer comprising a channel plug retained in the spacer channel and a corner guide positioned proximate a corner formed by the hinge edge, bottom edge, and one face of the panel; and a sill spacer retained on the sill between the channel plug and the sill.

13. A system according to claim 12, wherein the latch cavity is located in the latch side jamb.

14. A system according to claim 12, wherein the panel comprises an active panel and wherein the packaged prehung door system comprises a passive panel located between the latch edge of the active panel and the latch side jamb, wherein the passive panel comprises a passive panel latch edge facing the latch edge of the active panel and a passive panel hinge edge facing the latch side jamb, the passive panel attached to the latch side jamb and configured to rotate relative to the latch side jamb about a latch side jamb axis aligned with the latch side jamb;

wherein the latch cavity is located in the passive panel latch edge, and wherein the latch edge retainer apparatus is configured to retain the latch edge of the active panel in alignment with the passive panel latch edge.

15. A system according to claim 14, wherein the edge plate comprises a selected edge plate thickness measured along the latch bore, wherein the selected edge plate thickness comprises a desired spacing between the latch edge of the active panel and the passive panel latch edge.

16. A system according to claim 12, wherein the lock plug comprises a locking channel at a junction between the bore portion and the latch portion, wherein at least one aperture edge of the lock aperture is located in the locking channel when the edge plate of the panel clip is located between the latch edge of the panel and the latch side jamb and the bore portion of the lock plug is positioned in the latch bore such that the latch portion protrudes from the latch edge of the panel.

17. A system according to claim 16, wherein the lock plug is in a locked configuration when the aperture edge is located in the locking channel, and wherein the lock plug is configured to move from the locked configuration to an unlocked configuration in which the aperture edge is not located in the locking channel, wherein the lock plug rotates in the latch bore about the plug axis when moving between the locked configuration and the unlocked configuration.

18. A system according to claim 12, wherein the lock aperture in the edge plate comprises a slot that comprises an opening along a free edge of the edge plate, wherein the pair of aperture edges of the lock aperture extend from the free edge towards the common edge of the panel clip.

19. A system according to claim 12, wherein the bore portion comprises a maximum cross-plug bore dimension measured transverse to the plug axis and the latch portion comprises a maximum cross-plug latch dimension measured transverse to the plug axis, wherein the maximum cross-plug bore dimension is greater than the maximum cross-plug latch dimension.

20. A system according to claim 12, wherein the bore portion comprises a maximum cross-plug bore dimension measured transverse to the plug axis and wherein the latch bore comprises a latch bore diameter measured transverse to the latch axis, wherein the maximum cross-plug bore dimension is greater than or equal to the latch bore diameter.

21. A system according to claim 12, wherein the edge plate comprises a selected edge plate thickness measured along the latch bore, wherein the selected edge plate thickness comprises a desired spacing between the latch edge of the panel and the latch side jamb.

22. A system according to claim 12, wherein the system further comprises:

a latch side panel spacer comprising a latch side channel plug retained in the spacer channel and a latch side corner guide positioned proximate a corner formed by the hinge edge, bottom edge, and one face of the panel; and a latch side sill spacer retained on the sill between the latch side channel plug and the sill.

23. A system according to claim 22, wherein the latch side corner guide comprises an edge tab spaced at a selected distance from the latch side channel plug such that when the edge tab of the latch side panel spacer is placed against the latch edge, the latch side channel plug is in a selected position in the spacer channel on the bottom edge of the panel.

24. A packaged prehung door system comprising:

a door system frame comprising a hinge side jamb, a latch side jamb, and a sill extending between a sill end of the hinge side jamb and a sill end of the latch side jamb;

a panel comprising a hinge edge attached to the hinge side jamb and a latch edge facing the latch side jamb, the panel comprising a pair of faces spaced apart from each other and extending from the hinge edge to the latch edge, the panel comprising a bottom edge extending between the latch edge and the hinge edge and extending between the pair of faces of the panel, the panel configured to rotate relative to the hinge side jamb about a hinge axis aligned with the hinge side jamb, the bottom edge of the panel comprising a spacer channel extending along a length of the bottom edge from the latch edge to the hinge edge;

a deadbolt assembly installed in the panel, the deadbolt assembly comprising a deadbolt configured to extend from and retract into the latch edge of the panel;

a latch edge retainer apparatus configured to retain the latch edge of the panel in alignment with the latch side jamb, the latch edge retainer apparatus comprising:

a panel clip comprising an edge plate and a face plate attached to each other along a common edge, wherein the edge plate and the face plate are oriented transverse to each other such that when the edge plate is positioned on the latch edge of the panel, the face plate is positioned on a face of the panel and the common edge is proximate a corner formed at a junction between the latch edge and the face of the panel, and a lock aperture located in the edge plate;

a hinge side panel spacer comprising a channel plug retained in the spacer channel and a corner guide positioned proximate a corner formed by the hinge edge, bottom edge, and one face of the panel; and a sill spacer retained on the sill between the channel plug and the sill;

wherein, when the edge plate of the panel clip is located between the latch edge of the panel and the latch side jamb, the face plate is located on a selected face of the panel;

and wherein, when the deadbolt is extended from the latch edge of the panel, the deadbolt extends through the lock aperture into a deadbolt cavity facing the latch edge such that rotation of the panel is prevented by interference between the deadbolt and the deadbolt cavity.

25. A system according to claim 24, wherein the deadbolt cavity is located in the latch side jamb.

26. A system according to claim 24, wherein the panel comprises an active panel and wherein the packaged prehung door system comprises a passive panel located between the latch edge of the active panel and the latch side jamb, wherein the passive panel comprises a passive panel latch edge facing the latch edge of the active panel and a passive panel hinge edge facing the latch side jamb, the passive panel attached to the latch side jamb and configured to rotate relative to the latch side jamb about a latch side jamb axis aligned with the latch side jamb;

wherein the deadbolt cavity is located in the passive panel latch edge; and wherein the latch edge retainer apparatus is configured to retain the latch edge of the active panel in alignment with the passive panel latch edge.

27. A system according to claim 26, wherein the edge plate comprises a selected edge plate thickness measured along a bolt axis oriented transverse to the hinge axis, wherein the selected edge plate thickness comprises a desired spacing between the latch edge of the active panel and the passive panel latch edge.

28. A system according to claim 24, wherein the edge plate comprises a selected edge plate thickness measured along a bolt axis oriented transverse to the hinge axis, wherein the selected edge plate thickness comprises a desired spacing between the latch edge of the panel and the latch side jamb.

29. A system according to claim 24, wherein the corner guide comprises an edge tab spaced at a selected distance from the channel plug such that when the edge tab is placed against the hinge edge, the channel plug is in a selected position in the spacer channel on the bottom edge of the panel.

30. A system according to claim 24, wherein the panel comprises a bottom edge extending between the latch edge and the hinge edge, the bottom edge also extending between the pair of faces of the panel, and wherein the bottom edge of the panel comprises a spacer channel extending along a length of the bottom edge from the latch edge to the hinge edge, and wherein the system further comprises:

a latch side panel spacer comprising a latch side channel plug retained in the spacer channel and a latch side corner guide positioned proximate a corner formed by the hinge edge, bottom edge, and one face of the panel; and a latch side sill spacer retained on the sill between the latch side channel plug and the sill.

31. A system according to claim 30, wherein the latch side corner guide comprises an edge tab spaced at a selected distance from the latch side channel plug such that when the edge tab of the latch side panel spacer is placed against the latch edge, the latch side channel plug is in a selected position in the spacer channel on the bottom edge of the panel.

* * * * *